(12) United States Patent
Jang et al.

(10) Patent No.: US 11,451,786 B2
(45) Date of Patent: Sep. 20, 2022

(54) IMAGE CODING METHOD USING BUFFER COMPRESSION IN CTU UNIT, AND APPARATUS THEREFOR

(71) Applicant: LG ELECTRONICS INC., Seoul (KR)

(72) Inventors: Hyeongmoon Jang, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/257,795

(22) PCT Filed: Jul. 5, 2019

(86) PCT No.: PCT/KR2019/008270
§ 371 (c)(1),
(2) Date: Jan. 4, 2021

(87) PCT Pub. No.: WO2020/009515
PCT Pub. Date: Jan. 9, 2020

(65) Prior Publication Data
US 2021/0306639 A1    Sep. 30, 2021

Related U.S. Application Data

(60) Provisional application No. 62/694,429, filed on Jul. 5, 2018.

(51) Int. Cl.
*H04N 7/12* (2006.01)
*H04N 19/139* (2014.01)
*H04N 19/176* (2014.01)
*H04N 19/513* (2014.01)

(52) U.S. Cl.
CPC ......... *H04N 19/139* (2014.11); *H04N 19/176* (2014.11); *H04N 19/513* (2014.11)

(58) Field of Classification Search
CPC .. H04N 19/139; H04N 19/176; H04N 19/513; H04N 19/105; H04N 19/96
USPC ..................................... 375/240.16
See application file for complete search history.

(56) References Cited

U.S. PATENT DOCUMENTS

| | | | |
|---|---|---|---|
| 2016/0301942 A1* | 10/2016 | Qiu ...................... | H04N 19/423 |
| 2019/0116376 A1* | 4/2019 | Chen .................... | H04N 19/513 |
| 2020/0007889 A1* | 1/2020 | Chao .................... | H04N 19/593 |
| 2020/0267408 A1* | 8/2020 | Lee ....................... | H04N 19/105 |
| 2021/0058624 A1* | 2/2021 | Esenlik .................. | H04N 19/96 |
| 2021/0235080 A1* | 7/2021 | Ikai ....................... | H04N 19/119 |

FOREIGN PATENT DOCUMENTS

| | | |
|---|---|---|
| KR | 20130122652 A | 11/2013 |
| KR | 20140007071 A | 1/2014 |
| KR | 20140039082 A | 3/2014 |
| KR | 20150091414 A | 8/2015 |
| WO | 2017156669 A1 | 9/2017 |

* cited by examiner

Primary Examiner — Gims S Philippe
(74) Attorney, Agent, or Firm — Dentons US LLP

(57) ABSTRACT

Provided is an image decoding method performed by a decoding apparatus, which includes: decoding a first coding tree unit (CTU) in a current picture; storing motion information of the first CTU in a line buffer; and decoding a second CTU in the current picture by using the motion information of the first CTU stored in the line buffer, in which the first CTU is located around a left side of the second CTU or located around a top of the second CTU.

10 Claims, 25 Drawing Sheets

IMAGE CODING METHOD USING BUFFER COMPRESSION IN CTU UNIT, AND APPARATUS THEREFOR

CROSS-REFERENCE TO RELATED APPLICATIONS

This application is the National Stage filing under 35 U.S.C. 371 of International Application No. PCT/KR2019/008270, filed on Jul. 5, 2019, which claims the benefit of U.S. Provisional Application No. 62/694,429 filed on Jul. 5, 2018, the contents of which are all hereby incorporated by reference herein in their entirety.

BACKGROUND OF THE DISCLOSURE

Field of the Disclosure

The present disclosure relates to a video coding technology, and more particularly, to a video coding method using CTU unit buffer compression and an apparatus thereof in a video coding system.

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

SUMMARY OF THE DISCLOSURE

The present disclosure provides a method and an apparatus for increasing video coding efficiency.

The present disclosure also provides a method and an apparatus of video coding based on efficient inter prediction or intra prediction.

The present disclosure also provides a method and an apparatus for increasing video coding efficiency using CTU unit coding information compression based on a video segmentation structure.

The present disclosure also provides a method and an apparatus for efficiently performing CTU unit motion information compression using a line buffer.

In an aspect, a video decoding method performed by a decoding apparatus is provided. The method includes: decoding a first coding tree unit (CTU) in a current picture; storing motion information of the first CTU in a line buffer; and decoding a second CTU in the current picture by using the motion information of the first CTU stored in the line buffer, in which the first CTU is located around a left side of the second CTU or located around the top of the second CTU.

In another aspect, a video encoding method performed by an encoding apparatus is provided. The method includes: encoding a first coding tree unit (CTU) in a current picture; storing motion information of the first CTU in a line buffer; and encoding a second CTU in the current picture by using the motion information of the first CTU stored in the line buffer, in which the first CTU is located around a left side of the second CTU or located around the top of the second CTU.

According to the present disclosure, overall image/video compression efficiency can be increased.

According to the present disclosure, efficiency of video coding based on inter prediction or intra prediction can be increased.

According to the present disclosure, CTU unit coding information compression can be efficiently performed based on a video segmentation structure, thereby enhancing overall coding efficiency.

According to the present disclosure, CTU unit coding information compression can be efficiently performed using a line buffer, thereby enhancing prediction performance.

DESCRIPTION OF EXEMPLARY EMBODIMENTS

Figure 1:
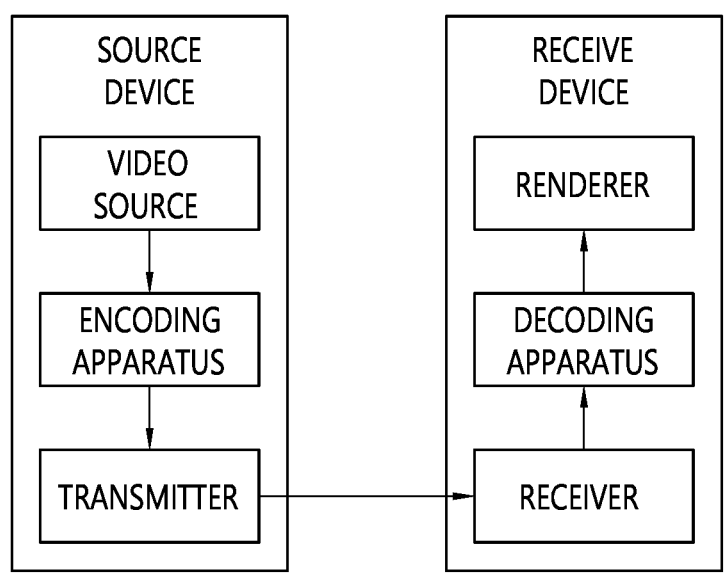
FIG. 1 schematically illustrates an example of a video/image coding system to which the present disclosure may be applied.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

Hereinafter, preferred embodiments of this document are described more specifically with reference to the accompanying drawings. Hereinafter, in the drawings, the same reference numeral is used in the same element, and a redundant description of the same element may be omitted.

This document relates to video/image coding. For example, the method/embodiment disclosed in this document may be related to a Versatile Video Coding (VVC) standard (ITU-T Rec. H.266), a next-generation video/image coding standard after VVC, or other video coding related standards (e.g., High Efficiency Video Coding (HEVC) standard (ITU-T Rec. H.265), and essential video coding (EVC) standard, AVS2 standard, etc.).

In this document, various embodiments of the video/image coding may be presented, and the above embodiments may be performed in combination with each other unless otherwise stated.

In this document, video may mean a set of a series of images over time. A picture generally means a unit representing one image in a specific time period, and a slice/tile is a unit constituting a part of the picture in the coding. The slice/tile may include one or more coding tree units (CTUs). One picture may be constituted by one or more slices/tiles. One picture may include one or more tile groups. One tile group may include one or more tiles.

A pixel or pel may mean a minimum unit constituting one picture (or image). Further, a "sample" may be used as a term corresponding to the pixel. The sample may generally indicate a pixel or a value of the pixel, indicate only a pixel/pixel value of a luma component, and indicate only a pixel/pixel value of a chroma component.

A unit may indicate a basic unit of image processing. The unit may include at least one of a specific area of the picture and information related to the corresponding area. One unit may include one luma block and two chroma (ex., cb and cr) blocks. The unit may be used in combination with a term such as a block or area in some cases. In a general case, an M×N block may include a set (array) of samples (or sample arrays) or transform coefficients constituted by M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C".

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively".

FIG. 1 schematically illustrates an example of a video/image coding system to which embodiments of this document may be applied.

Referring to FIG. 1, a video/image coding system may include a source device and a receiving device. The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
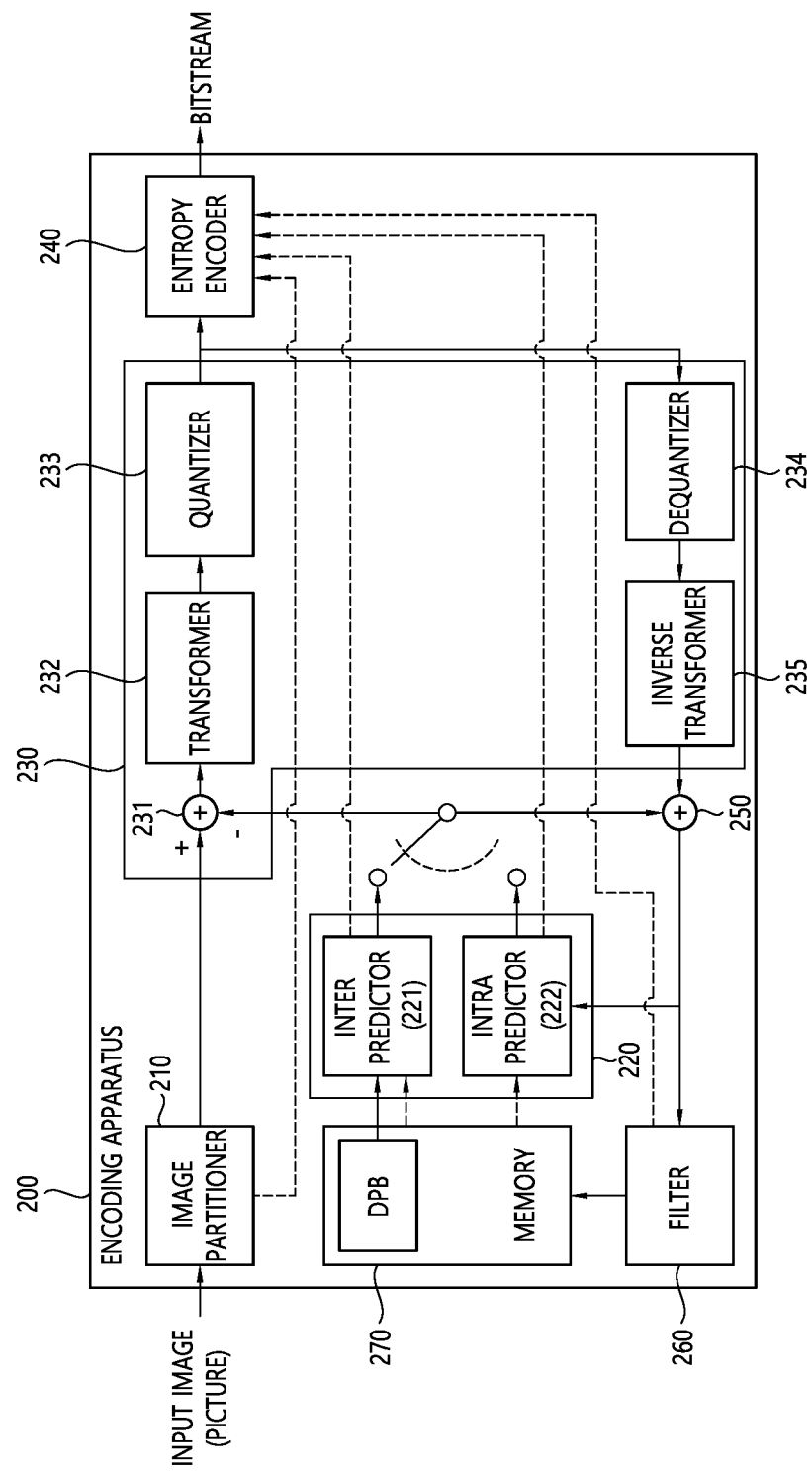
FIG. 2 is a diagram for schematically describing a video/image encoding apparatus to which the present disclosure may be applied.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

The subtractor 231 subtracts a prediction signal (a predicted block, prediction samples, or a prediction sample array) output from the predictor 220 from an input image signal (an original block, original samples, or an original sample array) to generate a residual signal (a residual block, residual samples, or a residual sample array) and the generated residual signal is transmitted to the transformer 232. The predictor 220 may perform prediction for a processing target block (hereinafter, referred to as a current block) and generate a predicted block including prediction samples for the current block. The predictor 220 may determine whether intra prediction is applied or inter prediction is applied in units of the current block or CU. The predictor may generate various information on prediction, such as prediction mode information, and transfer the generated various information to the entropy encoder 240 as described below in describing each prediction mode. The information on the prediction may be encoded by the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate the prediction signal based on various prediction methods to be described below. For example, the predictor may apply the intra prediction or inter prediction for prediction for one block and simultaneously apply the intra prediction and the inter prediction. This may be called combined inter and intra prediction (CIIP). In addition, the predictor may perform intra block copy (IBC) to predict the block. The intra block copy may be used for content image/video coding such as a game, for example, screen content coding (SCC). The IBC basically performs prediction in the current picture, but may be performed similarly to the inter prediction in that the IBC derives a reference block in the current picture. That is, the IBC may use at least one of the inter prediction techniques described in this document.

A prediction signal generated through the inter predictor 221 and/or the intra predictor 222 may be used for generating a reconstruction signal or used for generating the residual signal. The transformer 232 may generate transform coefficients by applying a transform technique to the residual signal. For example, the transform technique may include Discrete Cosine Transform (DCT), Discrete Sine Transform (DST), Graph-Based Transform (GBT), or Conditionally Non-linear Transform (CNT). Here, when relationship information between pixels is expressed by a graph, the GBT means a transform obtained from the graph. The CNT means a transform which generates the prediction signal by using all previously reconstructed pixels and is acquired based on the generated prediction signal. Further, a transform process may be applied to a square pixel block having the same size and applied even to a non-square block having a variable size.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. Signaled/transmitted information and/or syntax elements described later in this document may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the predictor 220 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
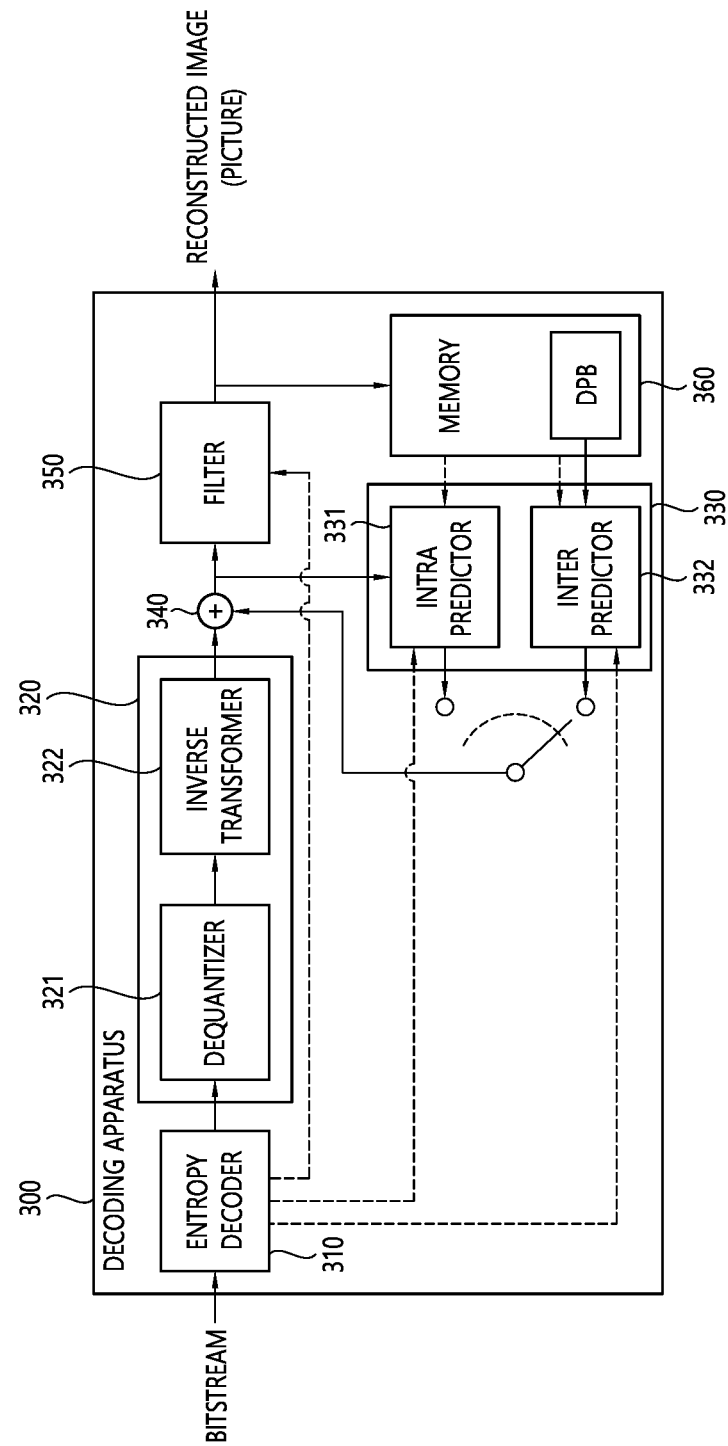
FIG. 3 is a diagram for schematically describing a configuration of a video/image decoding apparatus to which the present disclosure may be applied.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor 330, and information on the residual on which the entropy decoding was performed in the entropy decoder 310, that is, the quantized transform coefficients and related parameter information, may be input to the dequantizer 321. In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, and the memory 360.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor 330 may perform prediction on the current block and generate a predicted block including prediction samples for the current block. The predictor 330 may determine whether intra prediction or inter prediction is applied to the current block based on the information on the prediction output from the entropy decoder 310 and may determine a specific intra/inter prediction mode.

The predictor 330 may generate the prediction signal based on various prediction methods to be described below. For example, the predictor 330 may apply the intra prediction or inter prediction for prediction for one block and simultaneously apply the intra prediction and the inter prediction. This may be called combined inter and intra prediction (CIIP). In addition, the predictor 330 may perform intra block copy (IBC) to predict the block. The intra block copy may be used for content image/video coding such as a game, for example, screen content coding (SCC). The IBC basically performs prediction in the current picture, but may be performed similarly to the inter prediction in that the IBC derives a reference block in the current picture. That is, the IBC may use at least one of the inter prediction techniques described in this document.

The intra predictor 332 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 332 may determine the prediction mode applied to the current block by using the prediction mode applied to the neighboring block.

The inter predictor 331 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 331 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor 330. If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 331. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 332.

In the present disclosure, the embodiments described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

Meanwhile, a video compression technology is used in performing video coding, and principally, the video compression technology is designed and applied based on spatial redundancy and temporal redundancy. That is, in the present disclosure, as described above, prediction is performed using spatial information and temporal information in order to increase compression efficiency in performing the video coding. In order to perform the prediction, a process of reading already decoded information is required. Since the decoded information is stored in a storage, a memory access is required during a reading process, and this process requires a large number of cycles in the hardware of the encoding apparatus and the decoding apparatus. In order to solve such a problem, a memory structure such as a register that requires fewer cycles to access and read the memory may be used. The memory structure may be called a line buffer. However, since a specific memory such as the register requires a lot of hardware cost unlike a general dynamic random access memory (DRAM), the specific memory is used by determining a size of the specific memory in a trade-off between performance and price. Accordingly, it is common to store and use only particularly required data in the line buffer at the time of designing the hardware of the encoding apparatus and the decoding apparatus.

Further, a block unit partitioning structure is used in order to efficiently compress an image (or picture) in performing the video coding. The picture may be divided into a plurality of unit blocks having the same size, and the unit block may be recursively partitioned and each unit block may be partitioned into blocks of a type most suitable and for coding and compression. Here, the unit block may correspond to a coding tree unit (CTU) and blocks additionally partitioned from the unit block may correspond to a coding unit. Further, the coding unit may mean a basic unit for processing the image during a processing process of the image, e.g. a process such as intra/inter prediction, transform, quantization, and/or entropy coding.

Therefore, the present disclosure provides a method for efficiently performing encoding/decoding the image by applying the line buffer to the encoding apparatus and the decoding apparatus. Further, a method is proposed, which is capable of efficiently storing only data required for the line buffer by considering a trade-off relationship of the performance and the price of the line buffer, and in particular, a method is proposed, which compresses information required for encoding/decoding based on the partitioning structure of the image and stores the compressed information in the line buffer.

Figure 4:
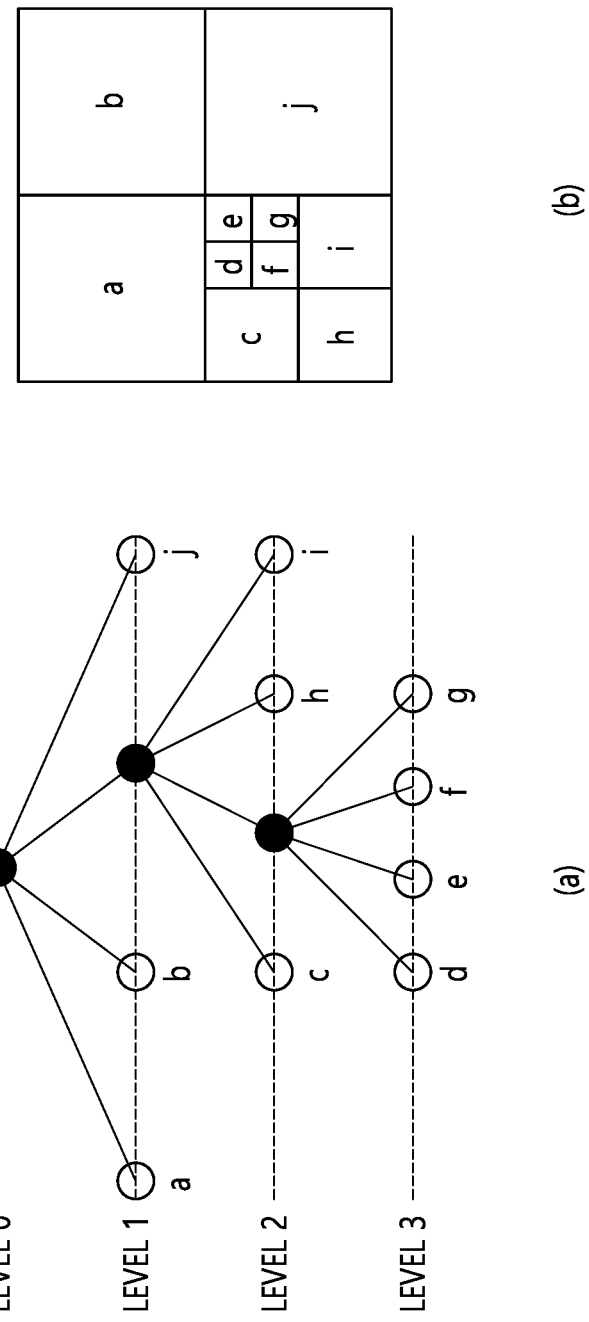
FIG. 4 is a diagram illustrating an example for describing a partition structure of a picture partitioned in units of a coding tree unit.

FIG. 4 is a diagram illustrating an example for describing a partition structure of a picture partitioned in units of a coding tree unit.

The encoding apparatus 200 may partition one image (or picture) into units of a coding tree unit (CTU) having a rectangular shape. In addition, each one CTU is sequentially encoded according to a raster scan order.

One CTU may be decomposed into a quadtree (hereinafter, referred to as 'QT') structure. For example, one CTU may be split into four units having a square shape and in which each side is reduced by half in length. Decomposition of the QT structure may be recursively performed.

Referring to FIG. 4, a root node of the QT may be associated with the CTU. The QT may be split until reaching a leaf node, and in this case, the leaf node may be referred to as a Coding Unit (CU).

Referring to FIG. 4, the CTU corresponds to the root node and has the smallest depth (i.e., level 0) value. The CTU may not be split according to the characteristics of the input image, and in this case, the CTU corresponds to the CU.

The CTU may be decomposed into QT types, and as a result, lower nodes having a depth of level 1 may be generated. In addition, a node (i.e., the leaf node) which is no longer split in the lower node having the depth of level 1 corresponds to the CU. For example, in FIG. 4(b), CU(a), CU(b), and CU(j) corresponding to nodes a, b, and j are split once in the CTU and have the depth of level 1.

For one CU, information representing whether the corresponding CU is split may be forwarded to the decoding apparatus 300. For example, the information may be defined as a split flag and expressed as a syntax element "split_cu_flag". The split flag may be included in all CUs other than the SCU. For example, when a value of the split flag is '1', the corresponding CU may be divided into four CUs again, and when the value of the split flag is '0', the corresponding CU is no longer divided and the coding process for the corresponding CU may be performed.

In the embodiment of FIG. 4 above, a split process of the CU is described as an example, but the QT structure may be applied even to a split process of a Transform Unit (TU) which is a basic unit that performs transform. The TU may be hierarchically split from a CU to be coded to the QT structure. For example, the CU may correspond to a root node of a tree for the transform unit (TU). Since the TU is split into the QT structure, the TU split from the CU may be split into smaller lower TUs again. For example, the size of the TU may be determined as any one of 32×32, 16×16, 8×8, and 4×4, but the present disclosure is not limited thereto, and in the case of the high-resolution image, the size of the TU may be larger or diversified. For one CU, information indicating whether the corresponding CU is split may be forwarded to the decoding apparatus 300. For example, the information may be defined as a split transform flag and expressed as a syntax element "split_transform_flag".

As described above, the CU is a basic unit of coding in which intra prediction or inter prediction is performed. In order to more effectively code the input image, the CU may be split in units of a Prediction Unit (PU). The PU is a basic unit for generating a prediction block and the prediction block may be generated differently in units of the PU even in one CU. The PU may be split differently according to whether an intra prediction mode or an inter prediction mode is used as a coding mode of a CU to which the PU belongs.

The decoding apparatus 300 may split the one image (or picture) in units of the CTU to correspond to the encoding apparatus 200 and sequentially decode the CTU one by one according to the raster scan order. For example, the decoding apparatus 300 may split the image in units of the CTU on split information (e.g., syntax element "split_cu_flag") signaled from the encoding apparatus 200 and perform decoding in units of the CTU.

Figure 5:
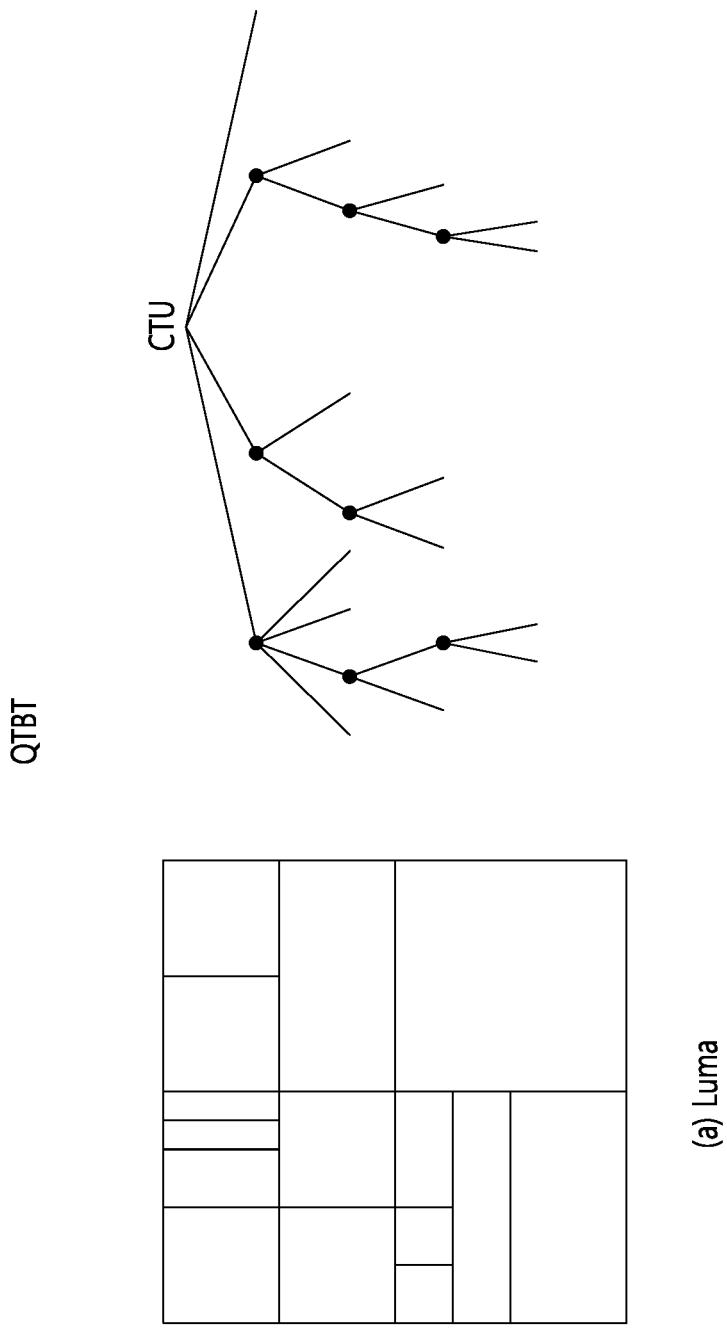
FIG. 5 is a diagram illustrating another example for describing a partition structure of a picture partitioned in units of a coding tree unit.

FIG. 5 is a diagram illustrating another example for describing a partition structure of a picture partitioned in units of a coding tree unit.

The encoding apparatus 200 may partition one image (or picture) into units of a coding tree unit (CTU) having a rectangular shape. In addition, each one CTU is sequentially encoded according to a raster scan order.

One CTU may be decomposed into a quadtree (hereinafter, referred to as 'QT') structure and a binary tree (hereinafter, referred to as BT). For example, one CTU may be split into four units having a square shape and in which each side is reduced by half in length or split into two units having a rectangular shape and in which a width or a height is reduced by half in length. Decomposition of the QTBT structure may be recursively performed.

Referring to FIG. 5, a root node of the QT may be associated with the CTU. The QT may be split until reaching a QT leaf node and the QT leaf node may be split into BTs and split until reaching a BT leaf node.

Referring to FIG. 5, the CTU corresponds to the root node and has the smallest depth (i.e., level 0) value. The CTU may not be split according to the characteristics of the input image and in this case, the CTU corresponds to the CU.

The CTU may be decomposed into the QT types and the QT leaf node may be split into the BT types. As a result, lower nodes having a depth of level n may be generated. In addition, a node (i.e., the leaf node) which is no longer split in a lower node having a depth of level n corresponds to the CU.

For one CU, information representing whether the corresponding CU is split may be forwarded to the decoding apparatus 300. For example, the information may be defined as a split flag and expressed as a syntax element "split_cu_flag". Further, information representing whether the corresponding CU is split into the BT in the QT leaf node may be forwarded to the decoding apparatus 300. For example, the information may be defined as a BT split flag and expressed as a syntax element "bt_split_flag". When the CU may be additionally split into the BTs by split_bt_flagh, a BT split shape may be forwarded to the decoding apparatus 300 so that the CU is split into a rectangular type having a width of a half size or a rectangular type having a height of a half size. For example, the information may be defined as a BT split mode and expressed as a syntax element "bt_split_mode".

The decoding apparatus 300 may split the one image (or picture) in units of the CTU to correspond to the encoding apparatus 200 and sequentially decode the CTU one by one according to the raster scan order. For example, the decoding apparatus 300 may split the image in units of the CTU unit on split information (e.g., syntax element "split_cu_flag") signaled from the encoding apparatus 200 and perform decoding in units of the CTU and additionally split the CTU into the BT types based on information (e.g., syntax elements "bt_split_flag" and "bt_split_mode") indicating whether the CTU is split into the BT.

As described with reference to FIGS. 4 and 5, it can be seen that one picture is split in units of the CTU and sequentially encoded/decoded units of the CTU. In this case, information of encoded/decoded neighboring CTU is required to encode/decode one CTU.

Figure 6:
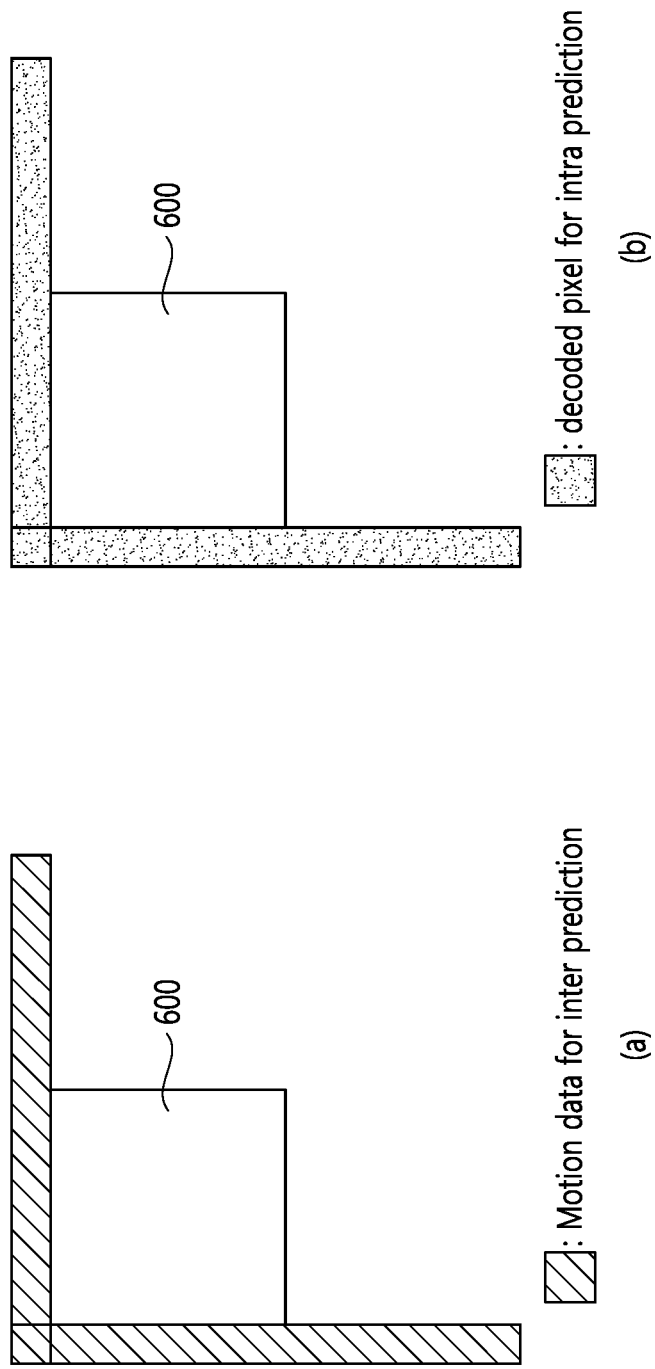
FIG. 6 illustrates information required for encoding/decoding one CTU.

FIG. 6 illustrates information required for encoding/decoding one CTU.

In encoding/decoding one CTU, the intra prediction or the inter prediction is applied to generate prediction samples. In this case, the corresponding CTU that intends to perform the intra prediction or the inter prediction is partitioned into blocks (i.e., prediction units) for performing prediction to perform the prediction using a neighboring CTU which is already encoded/decoded for each prediction unit.

Referring to FIG. 6(*a*), when a block (i.e., prediction unit) in a CTU 600 performs the inter prediction, decoded motion information (e.g., a motion vector, a reference picture index, etc.) is required around the CTU 600. For example, the block in the CTU 600 may perform the inter prediction using motion information of blocks included in a CTU located around a left side of the CTU 600 and/or motion information of blocks included in a CTU located around the top of the CTU 600.

Referring to FIG. 6(*b*), when the block (i.e., prediction unit) in the CTU 600 performs the intra prediction, decoded pixel information (e.g., a sample value) is required around the CTU 600. For example, the block in the CTU 600 may perform the intra prediction using pixel information included in the CTU located around the left side of the CTU 600 and/or pixel information included in the CTU located around the top of the CTU 600.

Of course, when the inter prediction is performed, a decoded pixel value of a reference picture for compensating the prediction block is also required, but since the information is so broad, read/write is performed in a DRAM other than the line buffer. However, the read/write is performed by a method for hiding a cycle required for a fetch process for performing the read/write in the DRAM in a pipeline process.

That is, as described in FIG. 6, coding efficiency may be increased by storing, in the line buffer, information of the neighboring CTU, which is information required during performing encoding/decoding in units of the CTU and using the stored information. Accordingly, the present disclosure provides a method for efficiently storing encoding/decoding information in the line buffer in units of the CTU.

Figure 7:
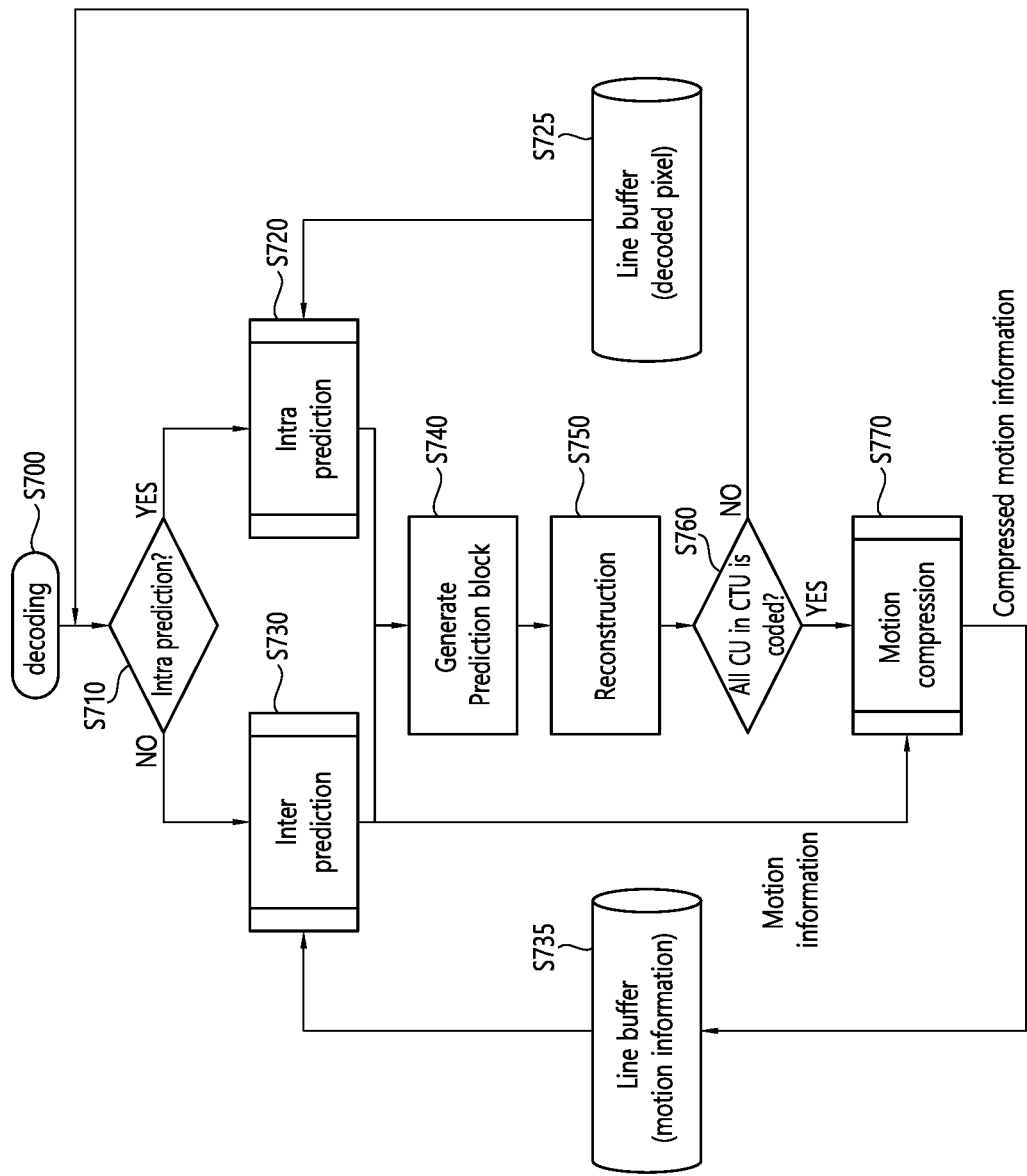
FIG. 7 is a flowchart showing an embodiment of a decoding method in units of CTU according to the present disclosure.

FIG. 7 is a flowchart showing an embodiment of a decoding method in units of CTU according to the present disclosure. The method of FIG. 7 may be performed by the encoding apparatus 200 and the decoding apparatus 300, but in FIG. 7, it is described that the method of FIG. 7 is performed by the decoding apparatus 300 for convenience of description.

Referring to FIG. 7, the decoding apparatus 300 may split a current picture in units of the CTU and sequentially decode the respective split CTUs (S700).

Here, one CTU is split into the QT or BT structure to include at least one coding unit. Further, at least one coding unit included in one cm may be split into at least one prediction unit in order to effectively perform the prediction.

The decoding apparatus 300 may determine whether to perform the intra prediction or the inter prediction for a first CTU to be currently decoded within a current picture (S710).

As an embodiment, the decoding apparatus 300 may determine whether the intra prediction is performed for a current block included in the first CTU. Here, the current block included in the first CTU may be referred to as the coding unit or the prediction unit. For example, a block unit for determining whether to perform the inter prediction or the intra prediction may be the coding unit and a block unit in which a block predicted by performing the inter prediction or the intra prediction and prediction related information are generated may be the prediction unit. In the embodiment, for convenience of description, the coding unit and the prediction unit are not separately used and are referred to as blocks.

When determining that the intra prediction is performed for the current block in the first CTU, the decoding apparatus 300 may perform the intra prediction for the current block in the first CTU (S720).

The decoding apparatus 300 may use decoding information (i.e., a decoded sample value) of a neighboring block adjacent to the current block in performing the intra prediction for the current block in the first CTU (S725).

The neighboring block may include left neighboring blocks adjacent to a left side of the current block and/or top neighboring blocks adjacent to an upper side of the current block. The left neighboring blocks may be blocks included in a CTU located on the left side of the first CTU and the top neighboring blocks may be blocks included in a CTU located on the upper side of the first CTU.

Here, the CTU including the left neighboring blocks and the CTU including the top neighboring blocks may have already been decoded. Decoding information (i.e., decoded sample values of the left neighboring blocks and decoded sample values of the top neighboring blocks) of the CTU for which decoding is completed may be stored in the line buffer.

Accordingly, the decoding apparatus 300 may perform the intra prediction of the current block in the first CTU unit on the decoded sample values of the left neighboring blocks and/or the decoded sample values of the top neighboring blocks stored in the line buffer.

When determining that the inter prediction is performed for the current block in the first CTU, the decoding apparatus 300 may perform the inter prediction for the current block in the first CTU (S730).

The decoding apparatus 300 may use decoding information (i.e., motion information) of a neighboring block adjacent to the current block in performing the inter prediction for the current block in the first CTU (S735).

The neighboring block may include left neighboring blocks adjacent to a left side of the current block and/or top neighboring blocks adjacent to an upper side of the current block. The left neighboring blocks may be blocks included in a CTU located on the left side of the first CTU and the top neighboring blocks may be blocks included in a CTU located on the upper side of the first CTU.

Here, the CTU including the left neighboring blocks and the CTU including the top neighboring blocks may have already been decoded. Decoding information (i.e., motion information of the left neighboring blocks and motion information of the top neighboring blocks) of the CTU for which decoding is completed may be stored in the line buffer.

Accordingly, the decoding apparatus 300 may perform the inter prediction of the current block in the first CTU unit based on the motion information of the left neighboring blocks and/or the motion information the top neighboring blocks stored in the line buffer. Here, the motion information may include information including a motion vector, a reference picture index, etc.

The decoding apparatus 300 may perform prediction (i.e., intra prediction or inter prediction) for the current block in the first CTU and generate a predicted sample value (i.e., predicted block) of the current block (S740).

The decoding apparatus 300 may derive a reconstructed sample value of the current block based on the predicted sample value for the current block in the first CTU (S750). That is, the decoding apparatus 300 may derive a residual sample value based on residual information of the current block and derive the reconstructed sample value based on the derived residual sample value and the predicted sample value. In this case, the residual information may be signaled from the encoding apparatus 200.

The decoding apparatus 300 may determine whether decoding is completed for all blocks in the first CTU (S760).

When decoding for all blocks in the first CTU is completed, the decoding apparatus 300 may compress the decoding information (i.e., motion information) of the first CTU and store the compressed decoding information in the line buffer (S770).

As an embodiment, the decoding apparatus 300 may compress the decoding information (i.e., motion information) of the blocks in the first CTU in units of a predetermined block and store the motion information compressed in units of the predetermined block in the line buffer. The motion information of the first CTU stored in the line buffer may be used during a decoding process (i.e., a prediction process) of a next CTU.

Here, a specific method for compressing the motion information of the blocks in the CTU in units of a predetermined block and storing the compressed motion information in the line buffer will be described below.

In the embodiment of FIG. 7 described above, when decoding of a current CTU (first CTU) is completed, a process of compressing decoding information of the current CTU (first CTU) in units of a predetermined block is performed and the decoding information compressed in units of the predetermined block is stored in the line buffer. Accordingly, the decoding information of the previous CTU (first CTU) stored in the line buffer is used at the time of decoding a next CTU (second CTU) and the decoding information compressed and stored in units of the block for the previous CTU (first CTU) is used. In this case, since decoding information of all CTUs which have been decoded is compressed, there is an advantage that a lot of decoding information may be stored in the line buffer, but there is a possibility that the decoding information will be lost during the compression process.

As a result, in an embodiment of FIG. 8 to be described below, a method will be proposed, which may compress the decoding information in units of the CTU, but may efficiently utilize the line buffer as much as possible and minimize performance decrease of the prediction block, which occurs during the process of the decoding information.

Figure 8:
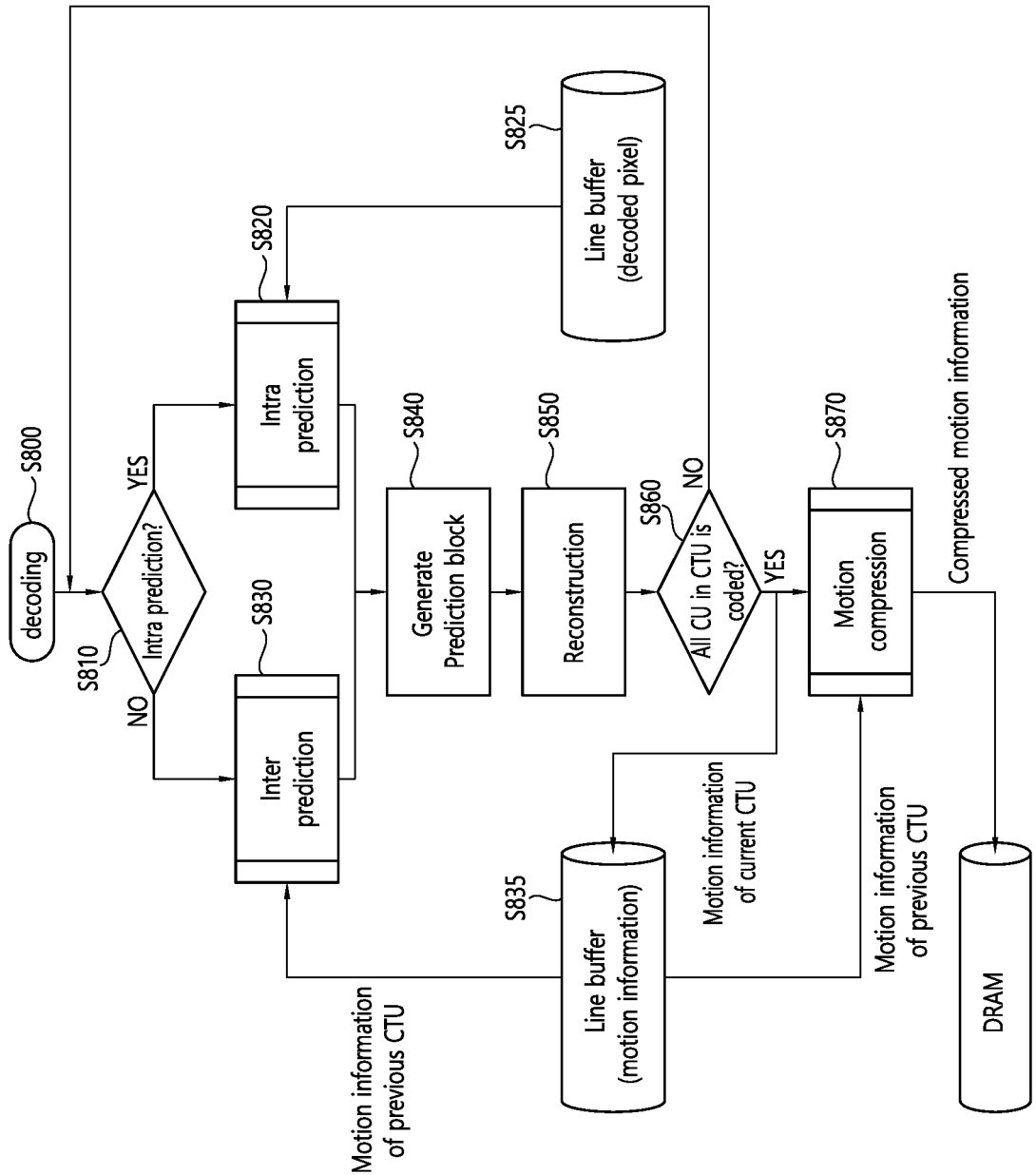
FIG. 8 is a flowchart showing another embodiment of a decoding method in units of CTU according to the present disclosure.

FIG. 8 is a flowchart showing another embodiment of a decoding method in units of CTU according to the present disclosure. The method of FIG. 8 may be performed by the encoding apparatus 200 and the decoding apparatus 300, but in FIG. 8, it is described that the method of FIG. 8 is performed by the decoding apparatus 300 for convenience of description.

Referring to FIG. 8, the decoding apparatus 300 may split a current picture in units of the CTU and sequentially decode the respective split CTUs (S800).

Here, one CTU is split into the QT or BT structure to include at least one coding unit. Further, at least one coding unit included in one cm may be split into at least one prediction unit in order to effectively perform the prediction.

The decoding apparatus 300 may determine whether to perform the intra prediction or the inter prediction for a first CTU to be currently decoded within a current picture (S810).

As an embodiment, the decoding apparatus 300 may determine whether the intra prediction is performed for a current block included in the first CTU. Here, the current block included in the first CTU may be referred to as the coding unit or the prediction unit. For example, a block unit for determining whether to perform the inter prediction or the intra prediction may be the coding unit and a block unit, in which a block predicted by performing the inter prediction or the intra prediction and prediction related information are generated, may be the prediction unit. In the embodiment, for convenience of description, the coding unit and the prediction unit are not separately used and are referred to as blocks.

When determining that the intra prediction is performed for the current block in the first CTU, the decoding apparatus 300 may perform the intra prediction for the current block in the first CTU (S820).

The decoding apparatus 300 may use decoding information (i.e., a decoded sample value) of a neighboring block adjacent to the current block in performing the intra prediction for the current block in the first CTU (S825).

The neighboring block may include left neighboring blocks adjacent to a left side of the current block and/or top neighboring blocks adjacent to an upper side of the current block. The left neighboring blocks may be blocks included in a CTU located on the left side of the first CTU and the top neighboring blocks may be blocks included in a CTU located on the upper side of the first CTU.

Here, the CTU including the left neighboring blocks and the CTU including the top neighboring blocks may have already been decoded. Decoding information (i.e., decoded sample values of the left neighboring blocks and decoded sample values of the top neighboring blocks) of the CTU for which decoding is completed may be stored in the line buffer.

Accordingly, the decoding apparatus 300 may perform the intra prediction of the current block in the first CTU unit on the decoded sample values of the left neighboring blocks and/or the decoded sample values of the top neighboring blocks stored in the line buffer.

When determining that the inter prediction is performed for the current block in the first CTU, the decoding apparatus 300 may perform the inter prediction for the current block in the first CTU (S830).

The decoding apparatus 300 may use decoding information (i.e., motion information) of a neighboring block adjacent to the current block in performing the inter prediction for the current block in the first CTU (S835).

The neighboring block may include left neighboring blocks adjacent to a left side of the current block and/or top neighboring blocks adjacent to an upper side of the current block. The left neighboring blocks may be blocks included in a CTU located on the left side of the first CTU and the top neighboring blocks may be blocks included in a CTU located on the upper side of the first CTU.

Here, the CTU including the left neighboring blocks and the CTU including the top neighboring blocks may have already been decoded. Decoding information (i.e., motion information of the left neighboring blocks and motion information of the top neighboring blocks) of the CTU for which decoding is completed may be stored in the line buffer.

Accordingly, the decoding apparatus 300 may perform the inter prediction of the current block in the first CTU unit on the motion information of the left neighboring blocks and/or the motion information the top neighboring blocks stored in the line buffer. Here, the motion information may include information including a motion vector, a reference picture index, etc.

The decoding apparatus 300 may perform prediction (i.e., intra prediction or inter prediction) for the current block in the first CTU and generate a predicted sample value (i.e., predicted block) of the current block (S840).

The decoding apparatus 300 may derive a reconstructed sample value of the current block based on the predicted sample value for the current block in the first CTU (S850). That is, the decoding apparatus 300 may derive a residual sample value based on residual information of the current block and derive the reconstructed sample value based on the derived residual sample value and the predicted sample value. In this case, the residual information may be signaled from the encoding apparatus 200.

The decoding apparatus 300 may determine whether decoding is completed for all blocks in the first CTU (S860).

When decoding for all blocks in the first CTU is completed, the decoding apparatus 300 may store the decoding information of the first CTU in the line buffer (S835).

The motion information of the first CTU stored in the line buffer may be used during a decoding process (i.e., a prediction process) of the next CTU. For example, the decoding information of the first CTU stored in the line buffer may be used during a decoding process of a CTU located adjacent to a right side of the first CTU.

Further, when decoding for all blocks in the first CTU is completed, the decoding apparatus 300 may perform a process of compressing the decoding information of the previous CTU stored in the line buffer (S870). The previous CTU may be a CTU that has been decoded before the first CTU, and may be, for example, a left neighboring CTU used for prediction of the first CTU.

As an embodiment, the decoding apparatus 300 may compress the decoding information (i.e., motion information) of the blocks in the previous CTU stored in the line buffer in units of a predetermined block and store the motion information compressed in units of the predetermined block in the DRAM. The decoding information of the previous CTU stored in the DRAM may be used during a decoding process (i.e., a prediction process) of a CTU to be decoded after the first CTU. For example, the decoding information of the previous CTU stored in the DRAM may be used during a decoding process of a CTU located adjacent to the bottom of the first CTU.

That is, the decoding information of the previous CTU used for prediction of the current CTU is not compressed but stored in the line buffer, and then, when decoding of the current CTU is completed, the decoding information is subjected to the compression process and stored in the DRAM. In this case, since there is no loss which occurs during the compression process for the decoding information stored in the line buffer, a decrease in prediction performance may be minimized during the decoding process of the current CTU. Further, since the decoding information of the current CTU is compressed and stored in the DRAM after decoding of the current CTU is completed, a cycle which occurs during a read/write process according to memory access may also be minimized.

Figure 9:
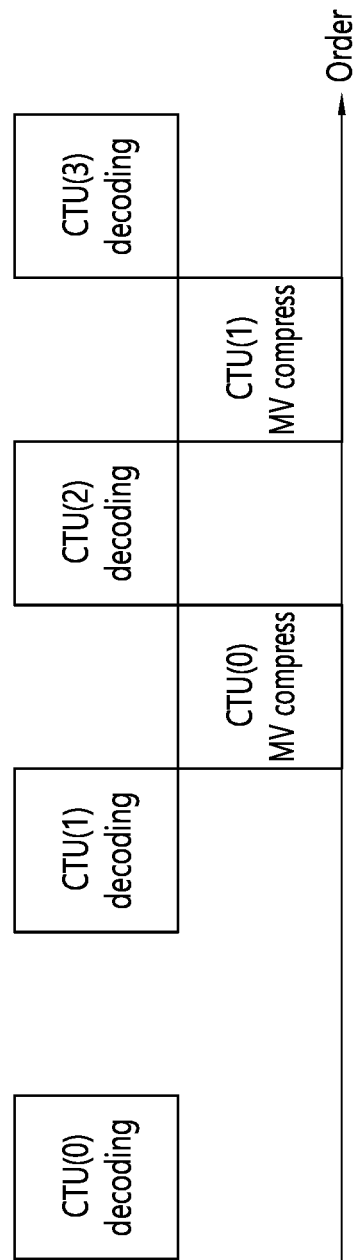
FIGS. 9 and 10 are diagrams for schematically describing a process of compressing and storing decoding information in units of CTU according to the present disclosure.
Figure 10:
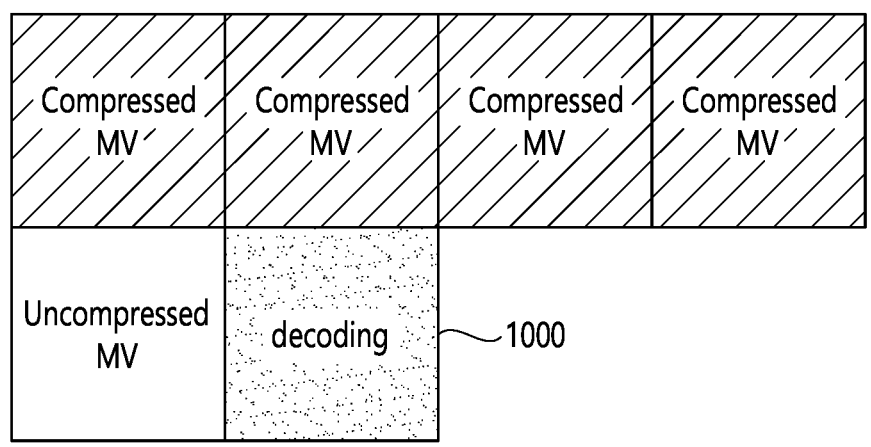

FIGS. 9 and 10 are diagrams for schematically describing a process of compressing and storing decoding information in units of CTU according to the present disclosure. FIGS. 9 and 10 exemplarily illustrate a decoding order of the CTUs in the current picture and whether to compress the CTUs when performing the method of FIG. 8 described above.

FIG. 9 illustrates a list of CTUs in the current picture according to a decoding order. Referring to FIG. 9, when decoding is performed in the order of CTU(0), CTU(1), CTU(2), and CTU(3), the decoding apparatus 300 may first decode the CTU(0). In addition, decoding information (i.e., motion information) of the CTU(0) for which decoding is completed may be stored in the line buffer.

Next, the decoding apparatus 300 may decode the CTU (1). In this case, the decoding apparatus 300 may use the decoding information of the CTU(0) stored in the line buffer during the decoding process (i.e., prediction process) of the CTU(1). Since the decoding information of the CTU(0) stored in the line buffer includes motion information of all blocks in the CTU(0) (that is, since a motion information compression process is not applied), the CTU(1) performing the prediction using the decoding information may be decoded without the decrease in prediction performance due to compression. In addition, decoding information (i.e., motion information) of the CTU(1) for which decoding is completed may be stored in the line buffer.

Next, when the decoding of the CTU(1) is completed, the decoding apparatus 300 may compress the decoding information (i.e., motion information) of the CTU(0) stored in the line buffer in units of a predetermined block. In addition, the decoding information of the CTU(0) compressed in units of the predetermined block may be continuously stored in the line buffer according to the performance of the line buffer or stored in the DRAM.

Next, the decoding apparatus 300 may decode the CTU (2). In this case, the decoding apparatus 300 may use the decoding information of the CTU(1) stored in the line buffer during the decoding process (i.e., prediction process) of the CTU(2). Since the decoding information of the CTU(1) stored in the line buffer includes motion information of all blocks in the CTU(1) (that is, since the motion information compression process is not applied), the CTU(2) performing the prediction using the decoding information may be decoded without the decrease in prediction performance due to compression. In addition, decoding information (i.e., motion information) of the CTU(2) for which decoding is completed may be stored in the line buffer.

Next, when the decoding of the CTU(2) is completed, the decoding apparatus 300 may compress the decoding information (i.e., motion information) of the CTU(1) stored in the line buffer in units of a predetermined block. In addition, the decoding information of the CTU(1) compressed in units of the predetermined block may be continuously stored in the line buffer according to the performance of the line buffer or stored in the DRAM.

Next, the decoding apparatus 300 may decode the CTU (3). In this case, the decoding apparatus 300 may use the decoding information of the CTU(2) stored in the line buffer during the decoding process (i.e., prediction process) of the CTU(3). Since the decoding information of the CTU(2) stored in the line buffer includes motion information of all blocks in the CTU(2) (that is, since a motion information compression process is not applied), the CTU(3) performing the prediction using the decoding information may be decoded without the decrease in prediction performance due to compression. In addition, decoding information (i.e., motion information) of the CTU(3) for which decoding is completed may be stored in the line buffer.

That is, the decoding apparatus 300 does not compress the decoding information of the previous CTU used for prediction of the current CTU but stores the corresponding decoding information in the line buffer, and then, when the decoding of the current CTU is completed, performs the compression process. The reason is that there is a high possibility that the previously decoded CTU will be referred to during the decoding process of the current CTU in the decoding order of the CTUs in the current picture. Accordingly, loss due to compression of the referenced information is minimized to increase prediction performance.

FIG. 10 illustrates whether decoding information of CTUs in the current picture is compressed. Referring to FIG. 10, a current CTU 1000 to be currently decoded in the current picture may perform prediction based on decoding information of a neighboring CTU. As an embodiment, the current CTU 1000 may perform the inter prediction or the intra prediction by referring to CTUs located around the top of the current CTU 1000 and CTUs located around the left side of the current CTU 1000. Here, decoding information for a CTU which is decoded by applying the intra prediction may mean a decoded sample value and decoding information for a CTU which is decoded by applying the inter prediction may mean motion information (e.g., a motion vector and a reference picture index).

In this case, since the CTUs in the picture are decoded according to the raster scan order, CTUs located on the top of the current CTU 1000 and CTUs located on the left side of the current CTU 1000 have already been decoded. Here, as illustrated in FIG. 10, since a left neighboring CTU used during the prediction process of the current CTU 1000 is decoded immediately before the current CTU 1000 in the decoding order in the current picture, decoding information of the left neighboring CTU may be stored in the line buffer. The decoding information of the left neighboring CTU stored in the line buffer may be information which is not compressed. Further, as illustrated in FIG. 10, since a top neighboring CTU used during the prediction process of the current CTU 1000 is different from the current CTU in the decoding order according to the raster scan order, decoding information of the top neighboring CTU may be information which has already been compressed.

However, since in such a method, decoding information compressed in units of CTU line is referred to, the prediction performance may be decreased, but this may be designed considering a trade-off relationship of the performance and the price of the line buffer. That is, it is important to design this method so as to increase the compression efficiency while minimizing the decrease in prediction performance.

Hereinafter, a method for compressing the decoding information (i.e., motion information) in units of CTU in order to enhance the performance of the line buffer and efficiently perform encoding/decoding of the image will be described in detail.

Figure 11:
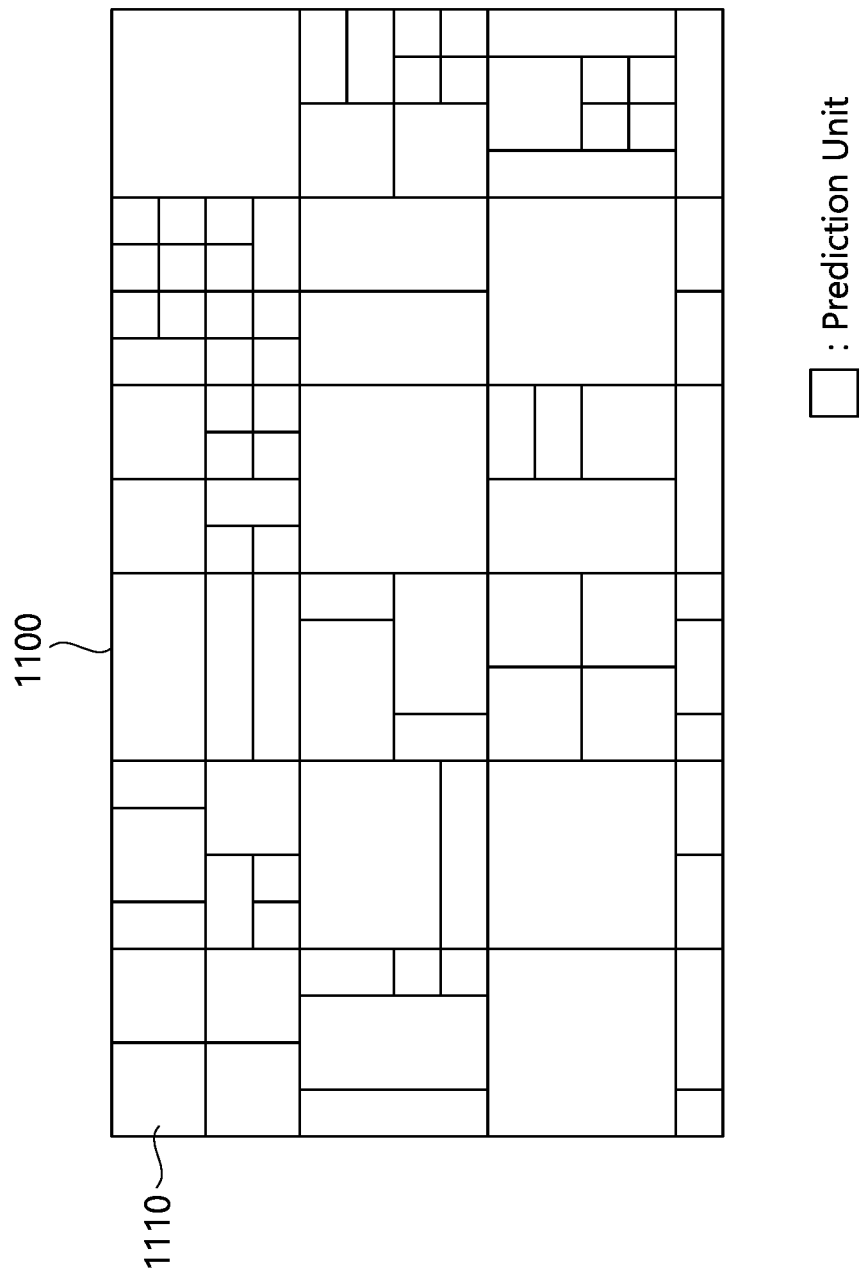
FIG. 11 exemplarily illustrates partitioned blocks in a picture during a decoding process.

FIG. 11 exemplarily illustrates partitioned blocks in a picture during a decoding process.

Referring to FIG. 11, a picture 1100 may be split in units of CTU during the decoding process and the split CTU may be split into coding units based on a split structure. In addition, in order to effectively perform the prediction, the coding unit may be partitioned or split into the prediction units. The inter prediction or the intra prediction may be performed for the partitioned or split prediction units and prediction related information for each prediction unit may be derived as a prediction result. For example, when the inter prediction is to be applied to a prediction unit 1110 in the picture 1100, prediction related information of the prediction unit 1110 may be derived. In this case, the prediction related information of the prediction unit 1110 may include motion information regarding the motion vector, the reference picture index, etc.

Figure 12:
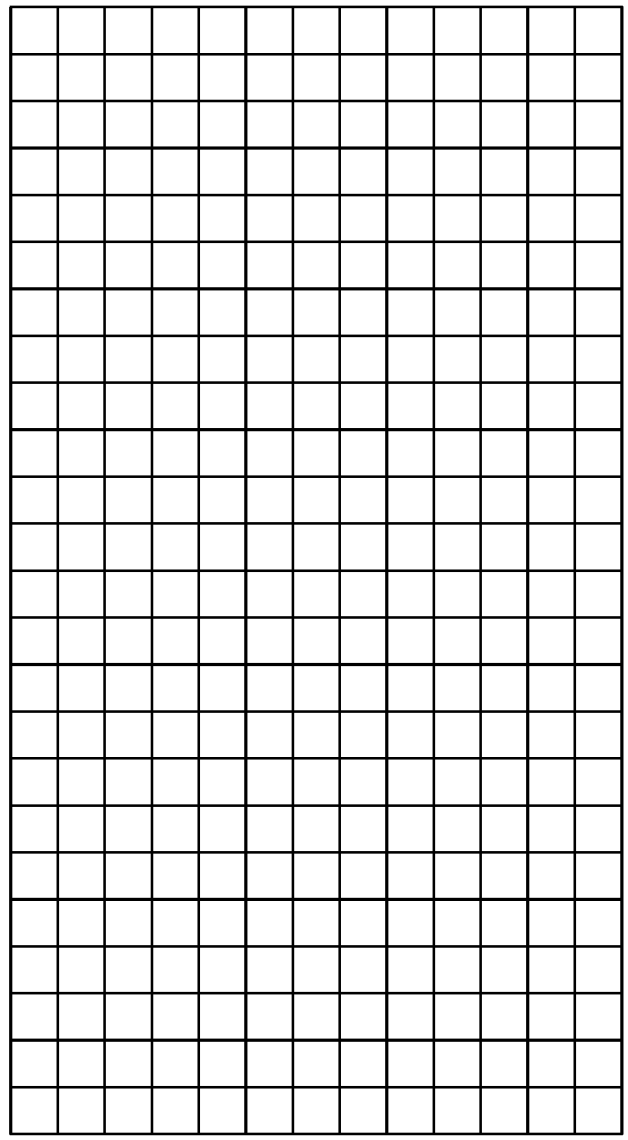
FIG. 12 is a diagram for schematically describing a method for storing decoding information in units of a minimum prediction unit.

FIG. 12 is a diagram for schematically describing a method for storing decoding information in units of minimum prediction unit.

As described above, the picture may be partitioned or split in units of the prediction unit in order to perform the prediction. When prediction units in the picture are split as illustrated in FIG. 11, the decoding information (i.e., motion information) may be stored for each prediction unit according to an implementation method of the decoder. However, when motion information of respective prediction units having different sizes is stored, split information for the prediction unit should also be stored together in addition to the motion information in order to manage and use the motion information of each prediction unit. In this case, overhead of the amount of data to be stored and operation complexity generated during a process of using the motion information of the corresponding prediction unit are significant.

Therefore, most of the decoders do not store the motion information in units of actually split divided prediction units as illustrated in FIG. 11, but store the motion information in units of a minimum prediction unit as illustrated in FIG. 12. The minimum prediction unit refers to a prediction unit having the smallest size. For example, if the minimum prediction unit has a 4×4 size, the motion information may be stored in units of the 4×4 size as illustrated in FIG. 12. However, even when the motion information is stored in units of the minimum prediction unit, the motion information has a significant amount of data to be stored in units of the CTU in the picture.

For example, in one of the technologies for video coding, a High Efficiency Video Coding (HEVC) standard, 74 bits are required to store the motion information in units of the minimum prediction unit, and stored in a 128-bit storage device in accordance with a hardware specification of the decoder. When a pixel value is described as an example, the pixel value has the same amount as an 8-bit image that becomes 8 bits*16=128 bits. Since the amount of data is stored in a memory (i.e., DPB), the amount of data may become a cause of increasing hardware cost of the decoder.

Further, since the size of the line buffer storing the decoding information in units of CTU should also increase according to the data amount, the increase in size of the line buffer influences the cost of the decoder.

By considering a cost problem of the decoder which occurs as the motion information is stored in units of the minimum unit, the motion information may be compressed and stored in units of a block larger having a larger size than the minimum prediction unit in the present disclosure.

Figure 13:
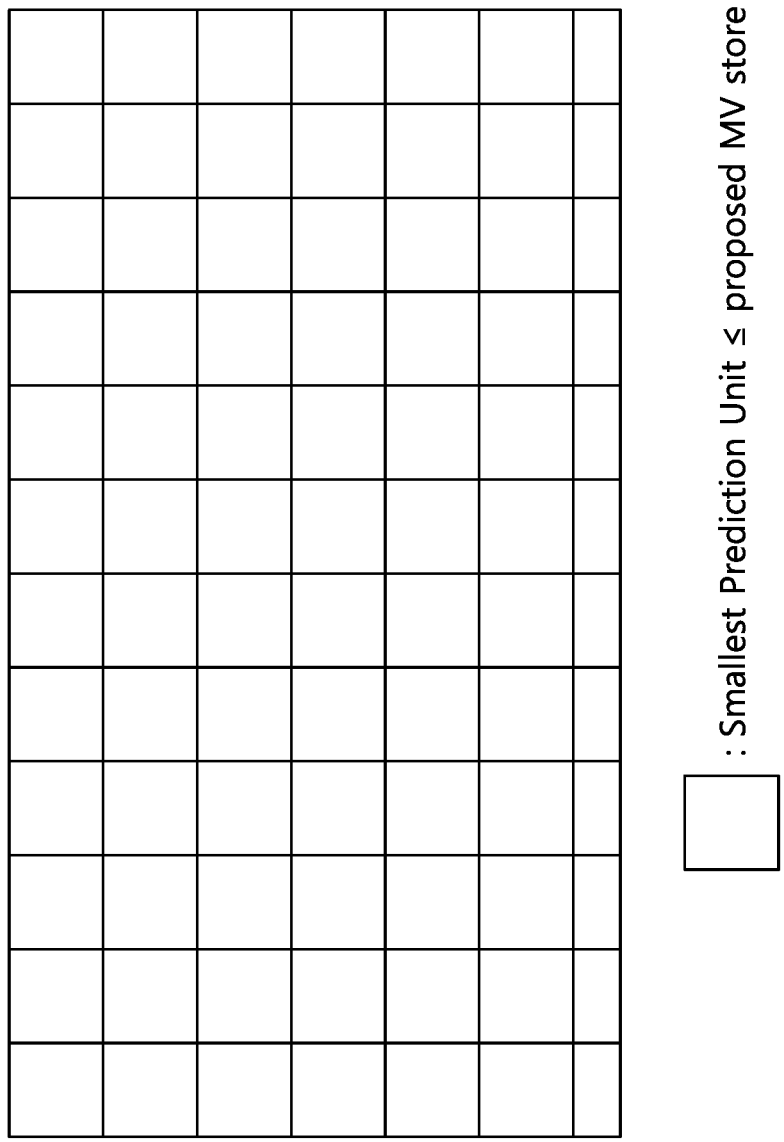
FIG. 13 is a diagram for schematically describing a method for compressing and storing decoding information in units of a predetermined block according to the present disclosure.

FIG. 13 is a diagram for schematically describing a method for compressing and storing decoding information in units of a predetermined block according to the present disclosure.

The motion information of the prediction units split to perform the prediction in the picture may be compressed and stored in units of a block having the larger size than the minimum prediction unit size as illustrated in FIG. 13.

For example, when the minimum prediction unit size is the 4×4 size, the block unit for storing the motion information according to the present disclosure may be set to a block having an N×N size larger than the 4×4 size. Here, N may be an integer. For example, the block unit having the N×N size may be set to a block having a size such as 8×8, 16×16, 32×32, 64×64, etc.

Figure 14:
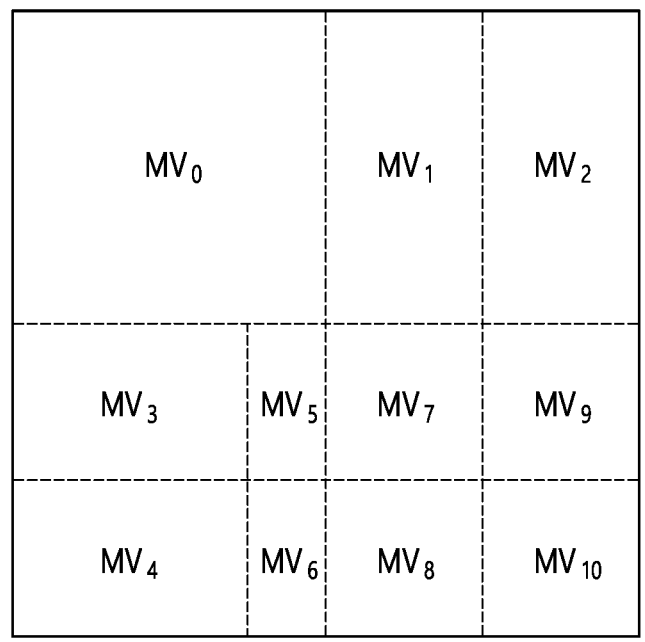
FIG. 14 exemplarily illustrates a case where a block unit having a predetermined size includes one or more prediction units.

FIG. 14 exemplarily illustrates a case where a block unit having a predetermined size includes one or more prediction units.

Referring to FIG. 14, since a storage block unit storing the decoding information (i.e., motion information) has a larger size than the minimum prediction unit size, one storage block unit may include one or more prediction units. In this case, each prediction unit may include each motion information. For example, referring to FIG. 14, an n-th prediction unit in one storage block unit may include an n-th motion vector (e.g., $MV_n$) as the motion information. Here, n=0, 1, . . . , 10.

That is, when a storage block unit having a predetermined size includes one or more prediction units, it is important to determine which prediction unit motion information among one or more prediction units is compressed and stored as motion information for the corresponding storage block. Therefore, the present disclosure proposes a method for determining representative motion information by representing the corresponding storage block unit among the motion information of the prediction units included in the storage block unit having the predetermined size.

Figure 15:
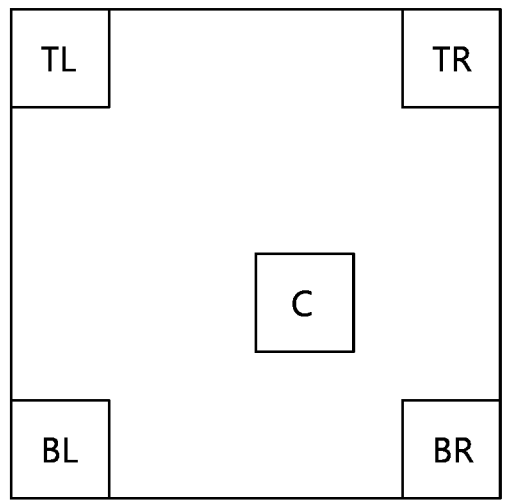
FIG. 15 exemplarily illustrates candidate blocks used to determine representative motion information stored by representing one storage block unit according to the present disclosure.

FIG. 15 exemplarily illustrates candidate blocks used to determine representative motion information stored by representing one storage block unit according to the present disclosure.

As an embodiment, a candidate block may be determined by specifying a representative position in one storage block unit. For example, as illustrated in FIG. 15, the candidate block may include at least one of a block (C candidate block) including a sample located at the center in the storage block unit, a block (TL candidate block) including a sample located on the top left, a block (TR candidate block) located on the top right, a block (BL candidate block) located on the bottom left, and a block (BR candidate block) located on the bottom right. In this case, the candidate block may be predefined.

Hereinafter, a method for determining the representative motion information to be stored by representing the corresponding storage block unit based on the candidate block in the storage block unit illustrated in FIG. 15 will be described in detail.

Figure 16:
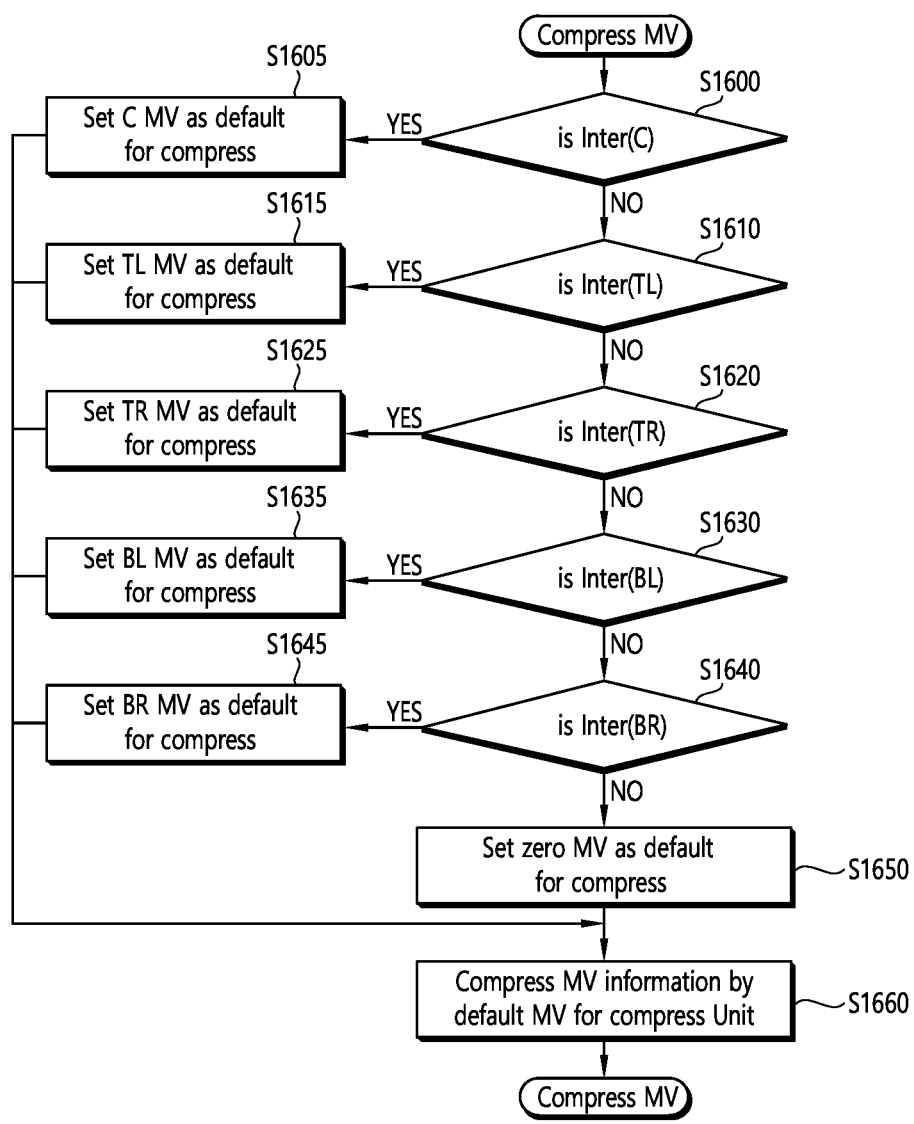
FIG. 16 is a flowchart showing an embodiment of a method for determining representative motion information in a storage block unit having a predetermined size based on a candidate block according to the present disclosure.

FIG. 16 is a flowchart showing an embodiment of a method for determining representative motion information in a storage block unit having a predetermined size based on a candidate block according to the present disclosure. The method of FIG. 16 may be performed by the encoding apparatus 200 and the decoding apparatus 300, but in FIG. 16, it is described that the method of FIG. 16 is performed by the decoding apparatus 300 for convenience of description.

As an embodiment, the decoding apparatus 300 determines whether the corresponding candidate block is available while traversing candidate blocks in the corresponding storage block unit in a predetermined order and sets the motion information of the available candidate block as the representative motion information. In this case, the candidate blocks may include the C candidate block, the TL candidate block, the TR candidate block, the BL candidate block, and the BR candidate block illustrated in FIG. 15. A predetermined traversal order of the candidate blocks may be an order of the C candidate block, the TL candidate block, the TR candidate block, the BL candidate block, and the BR candidate block.

When described in detail with reference to FIG. 16, the decoding apparatus 300 may determine whether the C candidate block in the storage block unit having the predetermined size is available (S1600). As an embodiment, the decoding apparatus 300 may determine whether the C candidate block is a block which is predicted in an inter prediction mode, and when the C candidate block is the block predicted in the inter prediction mode, the decoding apparatus 300 may determine that the C candidate block is available.

When the C candidate block is available, the decoding apparatus 300 may determine the motion information of the C candidate block as representative motion information for compression in the storage block unit and set the determined motion information as the motion information of the prediction units in the corresponding storage block unit (S1605). In this case, the decoding apparatus 300 may not perform a process of determining whether the TL candidate block, the TR candidate block, the BL candidate block, or the BR candidate block is available.

When the C candidate block is not available, the decoding apparatus 300 may determine whether the TL candidate block in the storage block unit having the predetermined size is available (S1610). As an embodiment, the decoding apparatus 300 may determine whether the TL candidate block is the block which is predicted in the inter prediction mode, and when the TL candidate block is the block predicted in the inter prediction mode, the decoding apparatus 300 may determine that the TL candidate block is available.

When the TL candidate block is available, the decoding apparatus 300 may determine the motion information of the TL candidate block as the representative motion information for compression in the storage block unit and set the determined motion information as the motion information of the prediction units in the corresponding storage block unit (S1615). In this case, the decoding apparatus 300 may not perform a process of determining whether the TL candidate block, the BL candidate block, or the BR candidate block is available.

When the TL candidate block is not available, the decoding apparatus 300 may determine whether the TR candidate block in the storage block unit having the predetermined size is available (S1620). As an embodiment, the decoding apparatus 300 may determine whether the TR candidate block is the block which is predicted in the inter prediction mode, and when the TR candidate block is the block predicted in the inter prediction mode, the decoding apparatus 300 may determine that the TR candidate block is available.

When the TR candidate block is available, the decoding apparatus 300 may determine the motion information of the TR candidate block as the representative motion information for compression in the storage block unit and set the determined motion information as the motion information of the prediction units in the corresponding storage block unit (S1625). In this case, the decoding apparatus 300 may not perform a process of determining whether the BL candidate block or the BR candidate block is available.

When the TR candidate block is not available, the decoding apparatus 300 may determine whether the BL candidate block in the storage block unit having the predetermined size is available (S1630). As an embodiment, the decoding apparatus 300 may determine whether the BL candidate block is the block which is predicted in the inter prediction mode, and when the BL candidate block is the block predicted in the inter prediction mode, the decoding apparatus 300 may determine that the BL candidate block is available.

When the BL candidate block is available, the decoding apparatus 300 may determine the motion information of the BL candidate block as the representative motion information for compression in the storage block unit and set the determined motion information as the motion information of the prediction units in the corresponding storage block unit (S1635). In this case, the decoding apparatus 300 may not perform a process of determining whether the BR candidate block or the BR candidate block is available.

When the BL candidate block is not available, the decoding apparatus 300 may determine whether the BR candidate block in the storage block unit having the predetermined size is available (S1640). As an embodiment, the decoding apparatus 300 may determine whether the BR candidate block is a block which is predicted in an inter prediction mode, and when the BR candidate block is the block predicted in the inter prediction mode, the decoding apparatus 300 may determine that the BR candidate block is available.

When the BR candidate block is available, the decoding apparatus 300 may determine the motion information of the BR candidate block as the representative motion information for compression in the storage block unit and set the determined motion information as the motion information of the prediction units in the corresponding storage block unit (S1645).

When the BR candidate block is not available, the decoding apparatus 300 determines that there is no available candidate block among the candidate blocks to set a default value as the representative motion information for compression in the storage block unit (S1650). As an embodiment, the default value may be a motion vector having a value of 0.

The decoding apparatus 300 may compress and store representative motion information finally determined while traversing the C candidate block, the TL candidate block, the TR candidate block, the BL candidate block, and the BR candidate block as described above for the corresponding storage block unit (S1660).

Figure 17:
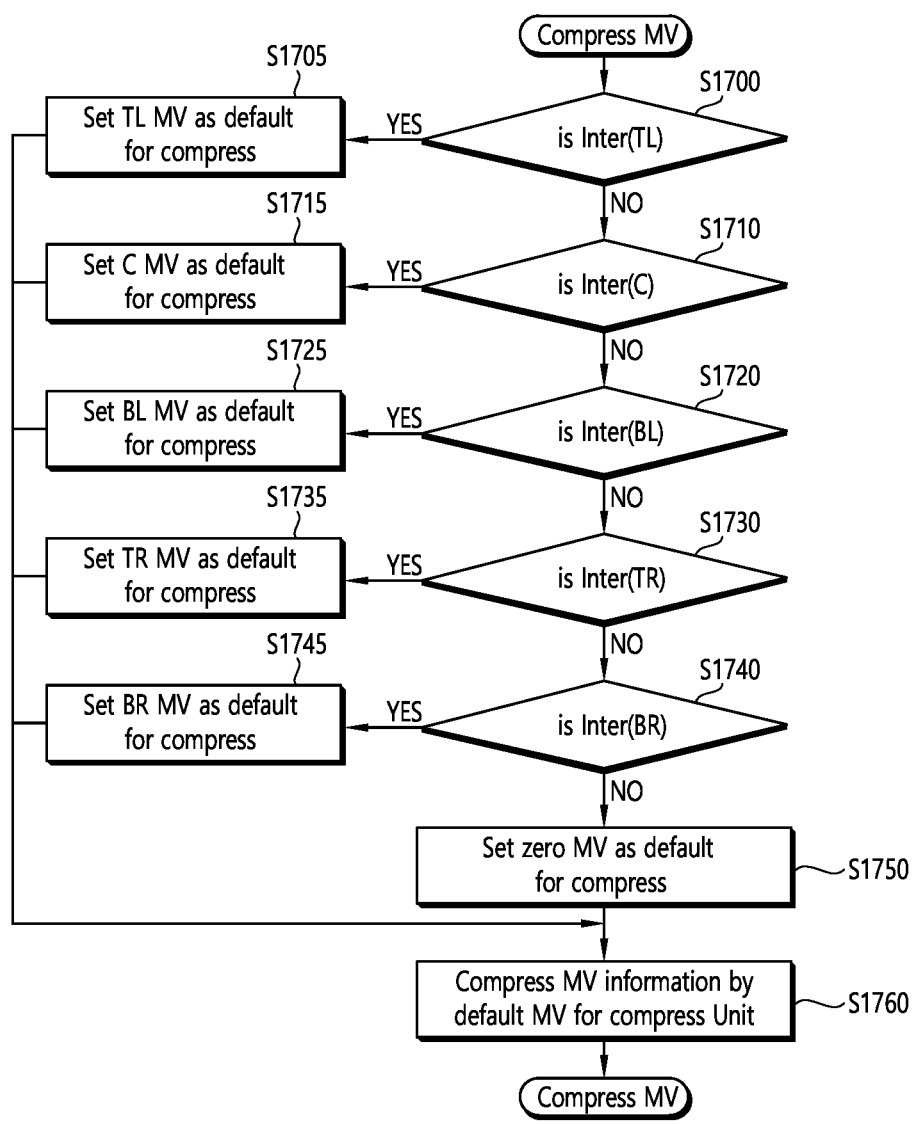
FIG. 17 is a flowchart showing another embodiment of a method for determining representative motion information in a storage block unit having a predetermined size based on a candidate block according to the present disclosure.

FIG. 17 is a flowchart showing another embodiment of a method for determining representative motion information in a storage block unit having a predetermined size based on a candidate block according to the present disclosure. The method of FIG. 17 may be performed by the encoding apparatus 200 and the decoding apparatus 300, but in FIG. 17, it is described that the method of FIG. 17 is performed by the decoding apparatus 300 for convenience of description.

As an embodiment, the decoding apparatus 300 determines whether the corresponding candidate block is available while traversing candidate blocks in the corresponding storage block unit in a predetermined order and sets the motion information of the available candidate block as the representative motion information. In this case, the candidate blocks may include the C candidate block, the TL candidate block, the TR candidate block, the BL candidate block, and the BR candidate block illustrated in FIG. 15. A predetermined traversal order of the candidate blocks may be an order of the TL candidate block, the C candidate block, the BL candidate block, the TR candidate block, and the BR candidate block.

When described in detail with reference to FIG. 17, the decoding apparatus 300 may determine whether the TL candidate block in the storage block unit having the predetermined size is available (S1700). As an embodiment, the decoding apparatus 300 may determine whether the TL candidate block is the block which is predicted in the inter prediction mode, and when the TL candidate block is the block predicted in the inter prediction mode, the decoding apparatus 300 may determine that the TL candidate block is available.

When the TL candidate block is available, the decoding apparatus 300 may determine the motion information of the TL candidate block as the representative motion information for compression in the storage block unit and set the determined motion information as the motion information of the prediction units in the corresponding storage block unit (S1705). In this case, the decoding apparatus 300 may not perform a process of determining whether the C candidate block, the BL candidate block, the TR candidate block, or the BR candidate block is available.

When the TL candidate block is not available, the decoding apparatus 300 may determine whether the C candidate block in the storage block unit having the predetermined size is available (S1710). As an embodiment, the decoding apparatus 300 may determine whether the C candidate block is the block which is predicted in the inter prediction mode, and when the C candidate block is the block predicted in the inter prediction mode, the decoding apparatus 300 may determine that the C candidate block is available.

When the C candidate block is available, the decoding apparatus 300 may determine the motion information of the C candidate block as representative motion information for compression in the storage block unit and set the determined motion information as the motion information of the prediction units in the corresponding storage block unit (S1715). In this case, the decoding apparatus 300 may not perform a process of determining whether the BL candidate block, the TR candidate block, or the BR candidate block is available.

When the C candidate block is not available, the decoding apparatus 300 may determine whether the BL candidate block in the storage block unit having the predetermined size is available (S1720). As an embodiment, the decoding apparatus 300 may determine whether the BL candidate block is the block which is predicted in the inter prediction mode, and when the BL candidate block is the block predicted in the inter prediction mode, the decoding apparatus 300 may determine that the BL candidate block is available.

When the BL candidate block is available, the decoding apparatus 300 may determine the motion information of the BL candidate block as the representative motion information for compression in the storage block unit and set the determined motion information as the motion information of the prediction units in the corresponding storage block unit (S1725). In this case, the decoding apparatus 300 may not perform a process of determining whether the TR candidate block or the BR candidate block is available.

When the BL candidate block is not available, the decoding apparatus 300 may determine whether the TR candidate block in the storage block unit having the predetermined size is available (S1730). As an embodiment, the decoding apparatus 300 may determine whether the TR candidate block is the block which is predicted in the inter prediction mode, and when the TR candidate block is the block predicted in the inter prediction mode, the decoding apparatus 300 may determine that the TR candidate block is available.

When the TR candidate block is available, the decoding apparatus 300 may determine the motion information of the TR candidate block as the representative motion information for compression in the storage block unit and set the determined motion information as the motion information of the prediction units in the corresponding storage block unit (S1735). In this case, the decoding apparatus 300 may not perform a process of determining whether the BR candidate block is available.

When the TR candidate block is not available, the decoding apparatus 300 may determine whether the BR candidate block in the storage block unit having the predetermined size is available (S1740). As an embodiment, the decoding apparatus 300 may determine whether the BR candidate block is a block which is predicted in an inter prediction mode, and when the BR candidate block is the block predicted in the inter prediction mode, the decoding apparatus 300 may determine that the BR candidate block is available.

When the BR candidate block is available, the decoding apparatus 300 may determine the motion information of the BR candidate block as the representative motion information for compression in the storage block unit and set the determined motion information as the motion information of the prediction units in the corresponding storage block unit (S1745).

When the BR candidate block is not available, the decoding apparatus 300 determines that there is no available candidate block among the candidate blocks to set a default value as the representative motion information for compression in the storage block unit (S1750). As an embodiment, the default value may be a motion vector having a value of 0.

The decoding apparatus 300 may compress and store representative motion information finally determined while traversing the TL candidate block, the C candidate block, the BL candidate block, the TR candidate block, and the BR candidate block as described above for the corresponding storage block unit (S1760).

The traversal orders of the candidate blocks in FIGS. 16 and 17 described above are just examples and the candidates may be traversed in an order different from the orders in FIGS. 16 and 17.

In the present disclosure, motion information of an available candidate block first searched while traversing all candidate blocks illustrated in FIG. 15 in a predetermined order may be determined as the representative motion information of the corresponding storage block unit and stored.

In this case, when all candidate blocks are traversed in order, hardware complexity may increase. Therefore, in the present disclosure, whether only an optimized candidate block is available by considering the hardware complexity to determine the representative motion information.

Figure 18:
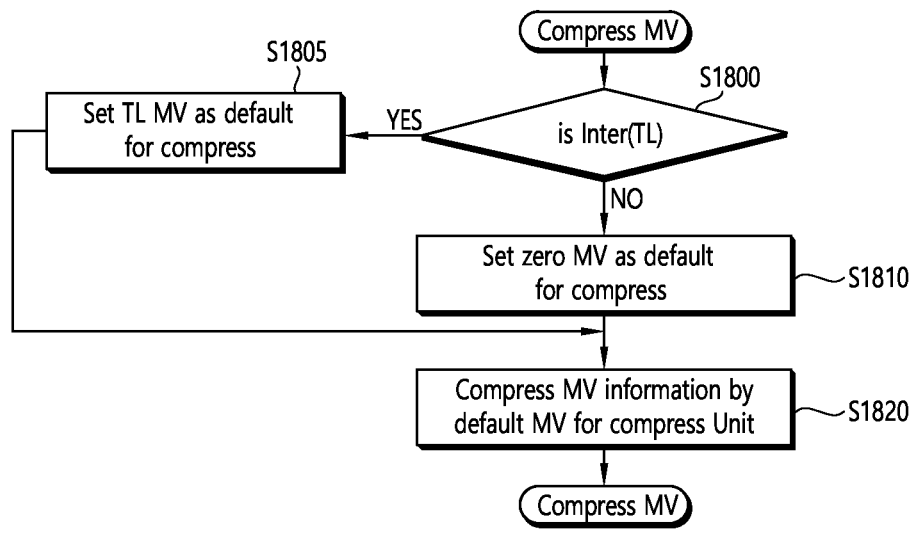
FIG. 18 is a flowchart showing an embodiment of a method for determining representative motion information in a storage block unit having a predetermined size based on an optimized candidate block according to the present disclosure.

FIG. 18 is a flowchart showing an embodiment of a method for determining representative motion information in a storage block unit having a predetermined size based on an optimized candidate block according to the present disclosure. The method of FIG. 18 may be performed by the encoding apparatus 200 and the decoding apparatus 300, but in FIG. 18, it is described that the method of FIG. 18 is performed by the decoding apparatus 300 for convenience of description.

As an embodiment, the decoding apparatus 300 may determine the representative motion information by using the TL candidate block in the storage block unit.

Referring to FIG. 18, the decoding apparatus 300 may determine whether the TL candidate block in the storage block unit having the predetermined size is available (S1800). As an embodiment, the decoding apparatus 300 may determine whether the TL candidate block is the block which is predicted in the inter prediction mode, and when the TL candidate block is the block predicted in the inter prediction mode, the decoding apparatus 300 may determine that the TL candidate block is available.

When the TL candidate block is available, the decoding apparatus 300 may determine the motion information of the TL candidate block as the representative motion information for compression in the storage block unit and set the determined motion information as the motion information of the prediction units in the corresponding storage block unit (S1805).

When the TL candidate block is not available, the decoding apparatus 300 may set a default value as the representative motion information for compression in the storage block unit (S1810). As an embodiment, the default value may be a motion vector having a value of 0.

The decoding apparatus 300 may compress and store the finally determined representative motion information for the corresponding storage block unit (S1820).

Figure 19:
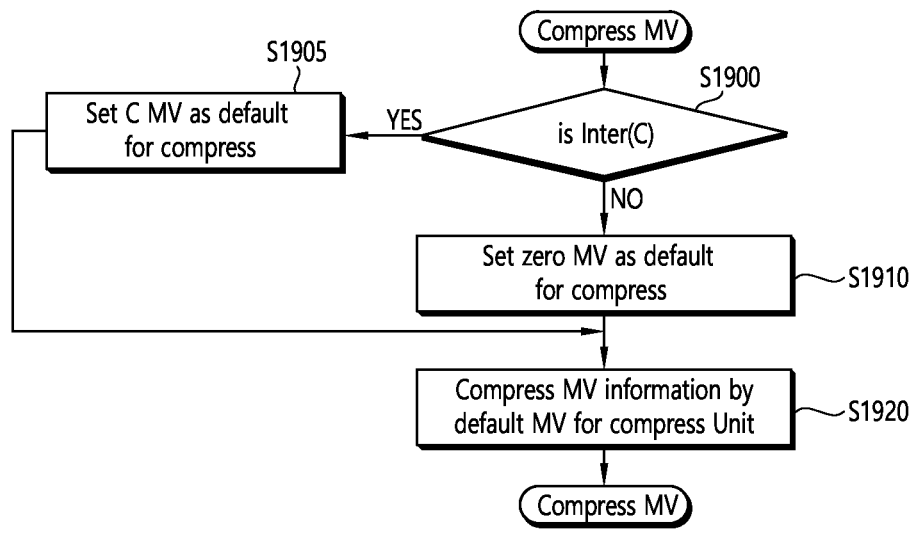
FIG. 19 is a flowchart showing another embodiment of a method for determining representative motion information in a storage block unit having a predetermined size based on an optimized candidate block according to the present disclosure.

FIG. 19 is a flowchart showing another embodiment of a method for determining representative motion information in a storage block unit having a predetermined size based on an optimized candidate block according to the present disclosure. The method of FIG. 19 may be performed by the encoding apparatus 200 and the decoding apparatus 300, but in FIG. 19, it is described that the method of FIG. 19 is performed by the decoding apparatus 300 for convenience of description.

As an embodiment, the decoding apparatus 300 may determine the representative motion information by using the C candidate block in the storage block unit.

Referring to FIG. 19, the decoding apparatus 300 may determine whether the C candidate block in the storage block unit having the predetermined size is available (S1900). As an embodiment, the decoding apparatus 300 may determine whether the C candidate block is the block which is predicted in the inter prediction mode, and when the C candidate block is the block predicted in the inter prediction mode, the decoding apparatus 300 may determine that the C candidate block is available.

When the C candidate block is available, the decoding apparatus 300 may determine the motion information of the C candidate block as representative motion information for compression in the storage block unit and set the determined motion information as the motion information of the prediction units in the corresponding storage block unit (S1905).

When the C candidate block is not available, the decoding apparatus 300 may set a default value as the representative motion information for compression in the storage block unit (S1910). As an embodiment, the default value may be a motion vector having a value of 0.

The decoding apparatus 300 may compress and store the finally determined representative motion information for the corresponding storage block unit (S1920).

In the present disclosure, one optimized candidate block may be used by considering the hardware complexity as described above, but one or more optimized candidate blocks may be used by considering a trade off condition of the compression performance and the complexity.

Figure 20:
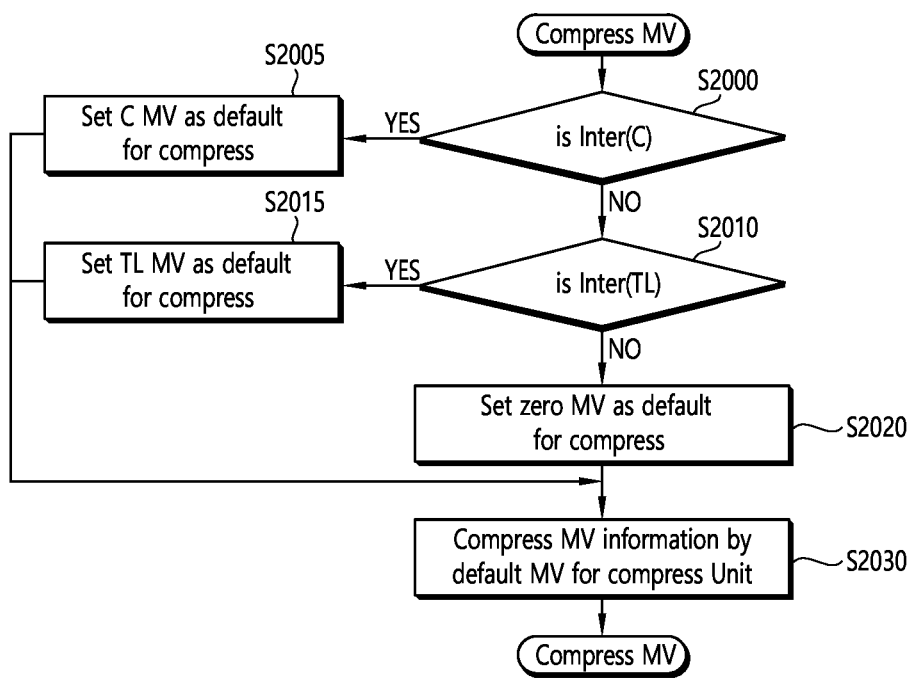
FIG. 20 is a flowchart showing an embodiment of a method for determining representative motion information in a storage block unit having a predetermined size based on two optimized candidate blocks according to the present disclosure.

FIG. 20 is a flowchart showing an embodiment of a method for determining representative motion information in a storage block unit having a predetermined size based on two optimized candidate blocks according to the present disclosure. The method of FIG. 20 may be performed by the encoding apparatus 200 and the decoding apparatus 300, but in FIG. 20, it is described that the method of FIG. 20 is performed by the decoding apparatus 300 for convenience of description.

As an embodiment, the decoding apparatus 300 may determine the representative motion information by using the C candidate block and the TL candidate block in the storage block unit. In this case, in respect to the traversal order of the candidate block, the candidate blocks may be searched in an order of the C candidate block and the TL candidate block.

Referring to FIG. 20, the decoding apparatus 300 may determine whether the C candidate block in the storage block unit having the predetermined size is available (S2000). As an embodiment, the decoding apparatus 300 may determine whether the C candidate block is the block which is predicted in the inter prediction mode, and when the C candidate block is the block predicted in the inter prediction mode, the decoding apparatus 300 may determine that the C candidate block is available.

When the C candidate block is available, the decoding apparatus 300 may determine the motion information of the C candidate block as representative motion information for compression in the storage block unit and set the determined motion information as the motion information of the prediction units in the corresponding storage block unit (S2005). In this case, the decoding apparatus 300 may not perform a process of determining whether the TL candidate block is available.

When the C candidate block is not available, the decoding apparatus 300 may determine whether the TL candidate block in the storage block unit having the predetermined size is available (S2010). As an embodiment, the decoding apparatus 300 may determine whether the TL candidate block is the block which is predicted in the inter prediction mode, and when the TL candidate block is the block predicted in the inter prediction mode, the decoding apparatus 300 may determine that the TL candidate block is available.

When the TL candidate block is available, the decoding apparatus 300 may determine the motion information of the TL candidate block as the representative motion information for compression in the storage block unit and set the determined motion information as the motion information of the prediction units in the corresponding storage block unit (S2015).

When the TL candidate block is not available, the decoding apparatus 300 determines that there is no available candidate block in the corresponding storage block unit to set a default value as the representative motion information for compression in the storage block unit (S2020). As an embodiment, the default value may be a motion vector having a value of 0.

The decoding apparatus 300 may compress and store representative motion information finally determined while traversing the C candidate block and the TL candidate block in order as described above for the corresponding storage block unit (S2030).

In the present disclosure, as described above, the representative motion information stored by representing the storage block unit may be determined based on the candidate block(s) and the representative motion information may be determined based on areas of the prediction units included in the storage block unit having the predetermined size.

Figure 21:
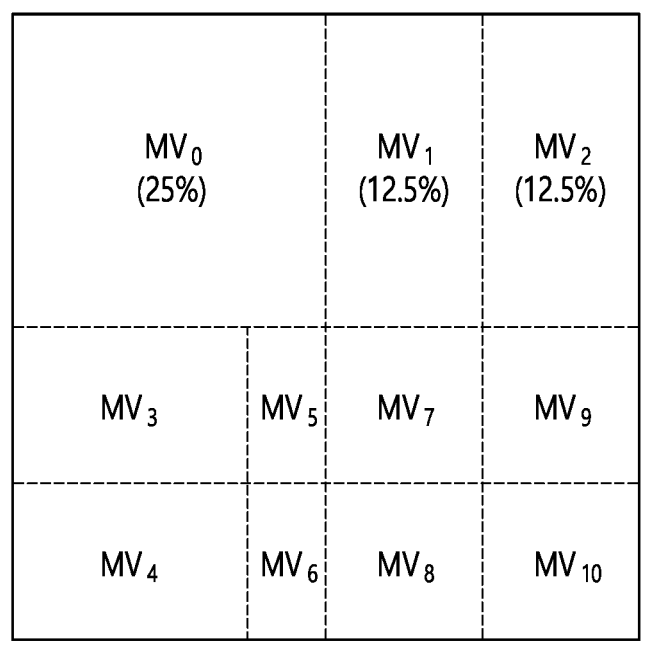
FIG. 21 is a diagram for describing a method for determining representative motion information based on areas of prediction units in a storage block unit having a predetermined size according to the present disclosure that exemplarily illustrates prediction units included in one storage block unit.

FIG. 21 is a diagram for describing a method for determining representative motion information based on areas of prediction units in a storage block unit having a predetermined size according to the present disclosure that exemplarily illustrates prediction units included in one storage block unit.

One storage block unit may include at least one prediction unit and the areas of the respective prediction units may be different as illustrated in FIG. 21.

As an embodiment, motion information for a prediction unit having the largest area among the prediction units included in the storage block unit having the predetermined size may be used as the representative motion information to be stored in the corresponding storage block unit. For example, in FIG. 21, a prediction unit including a motion vector of $MV_0$ occupies an area of approximately 25% which is the largest area in the corresponding storage block unit. In this case, the motion vector of $MV_0$ may be used as the representative motion information in the corresponding storage block unit.

A method for determining the representative motion information based on the areas of the prediction units included in the storage block unit as described above may be more effective in terms of hardware implementation than the process of searching the candidate blocks included in the storage block unit. That is, when hardware is implemented, complexity for a position calculation required for finding a candidate block which is present at a specific position may be removed and area information of the prediction unit may be just determined by a read operation, and as a result, it is advantageous in terms of the hardware.

When the representative motion information may not be determined in the corresponding storage block unit by the method proposed by the present disclosure, exception processing may be performed for the corresponding storage block unit. This will be described with reference to FIG. 22.

Figure 22:
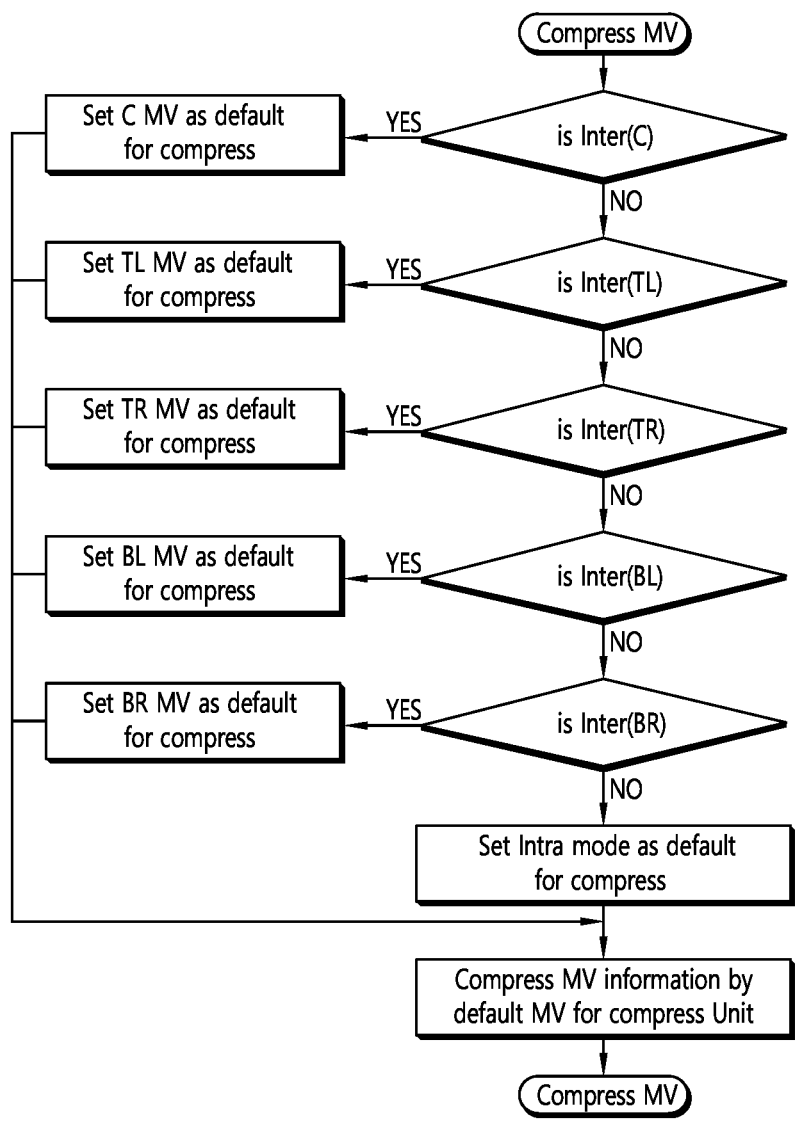
FIG. 22 is a diagram illustrating an embodiment of exception processing for representative motion information stored by representing one storage block unit according to the present disclosure.

FIG. 22 is a diagram illustrating an embodiment of exception processing for representative motion information stored by representing one storage block unit according to the present disclosure. The method of FIG. 22 may be performed by the encoding apparatus 200 and the decoding apparatus 300, but in FIG. 22, it is described that the method of FIG. 22 is performed by the decoding apparatus 300 for convenience of description.

Referring to FIG. 22, the decoding apparatus 300 determines whether the corresponding candidate block is available while traversing candidate blocks in the corresponding storage block unit in a predetermined order and sets the motion information of the available candidate block as the representative motion information. In this case, the candidate blocks may include the C candidate block, the TL candidate block, the TR candidate block, the BL candidate block, and the BR candidate block illustrated in FIG. 15. A predetermined traversal order of the candidate blocks may be an order of the C candidate block, the TL candidate block, the TR candidate block, the BL candidate block, and the BR candidate block.

When determining that all candidate blocks are not available as a result of traversing the C candidate block, the TL candidate block, the TR candidate block, the BL candidate block, and the BR candidate block in order, the decoding apparatus 300 may perform the exception processing for the corresponding storage block unit. That is, since this case is a case where the decoding apparatus 300 determines that all candidate blocks are not the blocks predicted in the inter prediction mode, the decoding apparatus 300 may set the representative motion information of the corresponding storage block unit as the intra prediction mode. In other words, since all candidate blocks are the blocks predicted in the intra prediction mode (not in the inter prediction mode), the representative motion information for compression in the storage block unit may be set as the intra prediction mode unlike setting the representative motion information to the motion vector having the value of 0 in the above-described embodiments.

Figure 23:
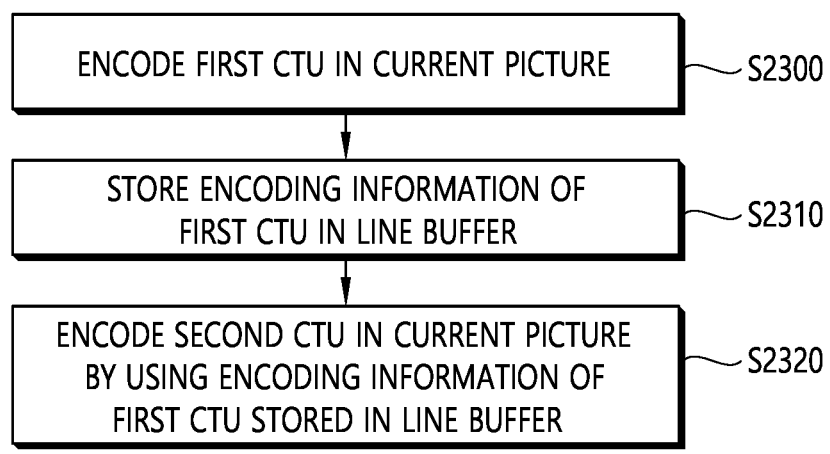
FIG. 23 is a flowchart schematically showing a video encoding method by an encoding apparatus according to the present disclosure.

FIG. 23 is a flowchart schematically showing an image encoding method by an encoding apparatus according to the present disclosure.

The method in FIG. 23 may be performed by the encoding apparatus 200 in FIG. 2. More specifically, steps S2300 to S2320 may be performed by the image partitioner 210, the predictor 220, or the memory 270 disclosed in FIG. 2. Further, the method disclosed in FIG. 23 may include the embodiments described above in the present disclosure and description of detailed contents which are redundant with the contents described with reference to FIGS. 1 to 22 will be omitted or simplified. In addition, the encoding apparatus 200 according to FIG. 23 may perform operations corresponding to operations of the decoding apparatus 300 according to FIG. 24 to be described below.

The encoding apparatus 200 may encode the first CTU in the current picture (S2300).

As described above, when encoding the current picture, the encoding apparatus 200 may split the current picture in units of the CTU, and may sequentially encode the respective split CTUs according to the raster scan order. Further, the encoding apparatus 200 may split each CTU in units of the coding unit in order to effectively perform encoding and split the split coding unit in units of the prediction unit in order to perform the prediction for the split coding unit. That is, the encoding apparatus 200 splits the current picture in units of the CTU, splits into the coding unit for coding process or the prediction unit for the prediction for each CTU unit, and performs the encoding for the split coding unit or prediction unit in order to increase the encoding efficiency.

As an embodiment, the encoding apparatus 200 may perform the encoding for the first CTU among the split CTUs in the current picture to thereby derive encoding information of the first CTU.

More specifically, in performing the encoding of the first CTU, the encoding apparatus 200 may perform the prediction. In this case, in order to efficiently perform the prediction, the first CTU is split into at least one block (i.e., prediction unit), and the inter prediction or intra prediction may be performed for each prediction unit. For example, when the intra prediction is to be performed for the prediction unit in the first CTU, the encoding apparatus 200 may acquire an encoded prediction sample value as a prediction result for the prediction unit in the first CTU. Alternatively, when the inter prediction is to be performed for the prediction unit in the first CTU, the encoding apparatus 200 may acquire motion information as the prediction result for the prediction unit in the first CTU. Here, the motion information may include information including a motion vector, a reference picture index, etc., of the prediction unit for which the inter prediction is performed.

Here, encoding information derived by encoding the first CTU may be the encoded sample value or the motion information according to whether the intra prediction or the inter prediction is applied to the blocks in the first CTU. That is, when the intra prediction is applied to the blocks in the first CTU, the encoding information of the first CTU may mean the encoded sample value, and when the inter prediction is applied to the blocks in the first CTU, the encoding information of the first CTU may mean the motion information.

The encoding apparatus 200 may store the encoding information of the first CTU in the line buffer (S2310).

When the first CTU is encoded, the encoding apparatus 200 may perform a process of compressing encoding information (i.e., motion information) for the blocks in the first CTU in units of a predetermined block. According to an embodiment, a motion information compression process may be performed immediately after encoding the first CTU is completed or performed after a next CTU of the first CTU is encoded.

As an embodiment, when the first CTU is encoded, the encoding apparatus 200 may compress the motion information for the blocks in the first CTU in units of the predetermined block and store the compressed motion information in the line buffer. In this case, since the encoding information of the CTU for which encoding is completed is compressed and stored in the line buffer, there is an advantage in that a large amount of data may be stored in the line buffer, but there may be a possibility that the loss of the encoding information will occur during the compression process.

As another embodiment, when the first CTU is encoded, the encoding apparatus 200 may store the motion information for the blocks in the first CTU in the line buffer. In addition, when encoding the next CTU of the first CTU is completed, the encoding apparatus 200 may perform a process of compressing the motion information for the blocks in the first CTU stored in the line buffer in units of the predetermined block. In this case, since the encoding information of the CTU for which encoding is completed is stored in the line buffer without compression, the performance of the line buffer may be decreased as compared with the case of storing the compressed information, but there is an effect that the decrease in prediction performance which occurs during the compression process may be minimized. This may be designed by considering a relationship between the performance of the line buffer and the prediction performance.

In compressing the motion information of the first CTU in a predetermined block unit (compression unit), the encoding apparatus 200 may select a candidate block at a representative position among the blocks of the first CTU included in the predetermined block unit and set the motion vector of the selected candidate block to be included in the representative motion information stored by representing the blocks of the first CTU included in the predetermined block unit.

Here, the candidate block may be determined by specifying the representative position in the predetermined block unit. For example, the candidate block may include at least one of a block located on the top left, a block located on the bottom right, a block located at the center, a block located on the top right, or a block located on the bottom left in the predetermined block unit.

Further, in respect to the candidate block, one optimized candidate block may be used by considering the hardware complexity of the encoder or a plurality of candidate blocks may be used by considering the trade off condition of the compression performance and the complexity.

As an embodiment, when the number of candidate blocks is determined as a plural number, the encoding apparatus 200 searches a plurality of candidate blocks in a predetermined order to select a candidate block which satisfies a predetermined condition. Here, the predetermined condition refers to determining whether the corresponding candidate block is a block for which the prediction is performed in the inter prediction mode, and when the corresponding candidate block is the block predicted in the inter prediction mode, the corresponding candidate block may be determined as an available candidate block which satisfies the predetermined condition.

Further, in compressing the motion information of the first CTU in a predetermined block unit (compression unit), the encoding apparatus 200 may select a candidate block at a representative position based on the areas of the blocks of the first CTU included in the predetermined block unit and set the motion vector of the selected candidate block to be included in the representative motion information stored by representing the blocks of the first CTU included in the predetermined block unit. As an embodiment, the encoding apparatus 200 may select a block having the largest area among the blocks of the first CTU included in the predetermined block unit as the candidate block and set the motion vector of the selected block having the largest area to be included in the representative motion information for the corresponding block unit.

The predetermined block unit may be equal to or larger than the size of the minimum prediction unit. For example, when the size of the minimum prediction unit is the 4×4 size, the predetermined block unit may be set to a block unit having a size larger than 4×4 and may be set to a block having a size such as 8×8, 16×16, 32×32, 64×64, etc., for example. Further, according to the design of the encoder, the predetermined block unit may be set to the block unit having the 4×4 size.

The method for compressing the motion information of the CTU in the predetermined block unit has been described in detail with reference to FIGS. 11 to 22, so a detailed description thereof will be omitted in the embodiment. Of course, even in the embodiment, the embodiments disclosed in FIGS. 11 to 22 may be applied.

The encoding apparatus 200 may encode the second CTU in the current picture by using the encoding information of the first CTU stored in the line buffer (S2320).

Here, the second CTU is encoded after the first CTU in the current picture in the encoding order and, for example, the second CTU may be located on the right side of the first CTU or located on the bottom of the first CTU. In other words, the already encoded first CTU may be located on the left side of the second CTU or the top of the second CTU.

As an embodiment, the encoding apparatus 200 may perform prediction for the second CTU during an encoding process of the second CTU. In this case, the second CTU may be predicted by using the encoding information of the first CTU located around the second CTU. As described with reference to FIGS. 7 to 10, the encoding information of the first CTU may be compressed and stored in the line buffer in the predetermined block unit or all encoding information for the blocks in the first CTU may be stored while not being compressed according to an embodiment.

For example, when the encoding apparatus 200 is designed by considering efficiency for the performance of the line buffer, the encoding apparatus 200 may operate as in the embodiment of FIG. 7 described above. In this case, the encoding information of the first CTU may be compressed and stored in the line buffer in the predetermined block unit. Accordingly, the encoding apparatus 200 may perform the prediction of the second CTU by referring to the compressed encoding information of the first CTU stored in the line buffer.

As another example, when the encoding apparatus 200 is designed to increase compression efficiency while minimizing deterioration in prediction performance, the encoding apparatus 200 may operate as in the embodiments described in FIGS. 8 to 10. In this case, the encoding apparatus 200 may not compress the encoding information of the previous CTU (first CTU) used for predicting the current CTU (second CTU) but store the encoding information in the line buffer, and then, when encoding of the current CTU (second CTU) is completed, perform the compression process and store the encoding information in the line buffer or a DRAM. For example, when the first CTU is located around the left side of the second CTU, the encoding apparatus 200 may perform prediction of the second CTU by referring to the encoding information of the first CTU stored in the line buffer (not compressed). Alternatively, when the first CTU is located around the top of the second CTU, the compression process of the encoding information of the first CTU may be already performed before encoding the second CTU. In this case, the encoding apparatus 200 may perform the prediction of the second CTU by referring to the compressed encoding information of the first CTU stored in the line buffer.

The encoding information may be motion information of blocks in the CTU or encoded sample values of the blocks in the CTU. For example, when the current block in the CTU is encoded in the intra prediction mode, the encoding information of the CTU may mean an encoded sample value of the current block in the corresponding CTU. Alternatively, when the current block in the CTU is encoded in the inter prediction mode, the encoding information of the CTU may mean motion information of the current block in the corresponding CTU.

Figure 24:
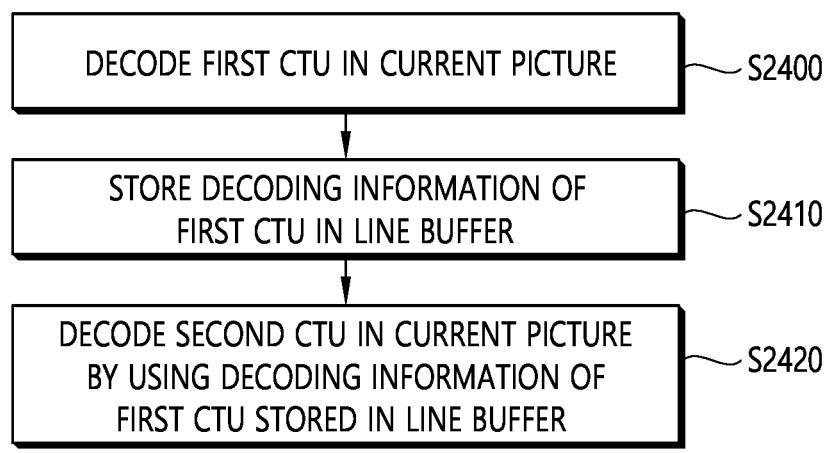
FIG. 24 is a flowchart schematically showing a video decoding method by a decoding apparatus according to the present disclosure.

FIG. 24 is a flowchart schematically showing an image decoding method by a decoding apparatus according to the present disclosure.

The method in FIG. 24 may be performed by the decoding apparatus 300 in FIG. 3. More specifically, steps S2400 to S2420 may be performed by the entropy decoder 310, the predictor 330, or the memory 360 disclosed in FIG. 3. Further, the method disclosed in FIG. 24 may include the embodiments described above in the present disclosure and description of detailed contents which are redundant with the contents described with reference to FIGS. 1 to 22 will be omitted or simplified. Further, the decoding apparatus 300 according to FIG. 24 may perform operations corresponding to the operations of the encoding apparatus 200 according to FIG. 23 to be described below.

The decoding apparatus 300 may decode the first CTU in the current picture (S2400).

As described above, when decoding the current picture, the decoding apparatus 300 may split the current picture in units of the CTU, and may sequentially decode the respective split CTUs according to the raster scan order. Further, the decoding apparatus 300 may split each CTU in units of the coding unit in order to effectively perform decoding and split the split coding unit in units of the prediction unit in order to perform the prediction for the split coding unit. That is, the decoding apparatus 300 splits the current picture in units of the CTU and splits the current picture into the coding unit for coding process or the prediction unit for the prediction for each CTU unit and performs the decoding in order to increase decoding efficiency. The decoding apparatus 300 may perform a CTU-unit split process based on split information (e.g., a syntax element "split_cu_flag" which is information indicating whether the coding unit in the CTU is split) for the picture signaled from the encoding apparatus 200.

As an embodiment, the decoding apparatus 300 may perform decoding for the first CTU among the split CTUs in the current picture to thereby derive decoding information of the first CTU.

More specifically, in performing the decoding of the first CTU, the decoding apparatus 300 may perform the prediction. In this case, in order to efficiently perform the prediction, the first CTU is split into at least one block (i.e., prediction unit), and the inter prediction or intra prediction may be performed for each prediction unit. For example, when the intra prediction is to be performed for the prediction unit in the first CTU, the decoding apparatus 300 may acquire a decoded prediction sample value as a prediction result for the prediction unit in the first CTU. Alternatively, when the inter prediction is to be performed for the prediction unit in the first CTU, the decoding apparatus 300 may acquire motion information as the prediction result for the prediction unit in the first CTU. Here, the motion information may include information including a motion vector, a reference picture index, etc., of the prediction unit for which the inter prediction is performed.

Here, decoding information derived by decoding the first CTU may be the decoded sample value or the motion information according to whether the intra prediction or the inter prediction is applied to the blocks in the first CTU. That is, when the intra prediction is applied to the blocks in the first CTU, the decoding information of the first CTU may mean the decoded sample value, and when the inter prediction is applied to the blocks in the first CTU, the decoding information of the first CTU may mean the motion information.

The decoding apparatus 300 may store the decoding information of the first CTU in the line buffer (S2410).

When the first CTU is decoded, the decoding apparatus 300 may perform a process of compressing decoding information (i.e., motion information) for the blocks in the first CTU in units of a predetermined block. According to an embodiment, a motion information compression process may be performed immediately after decoding the first CTU is completed or performed after a next CTU of the first CTU is decoded.

As an embodiment, when the first CTU is decoded, the decoding apparatus 300 may compress the motion information for the blocks in the first CTU in units of the predetermined block and store the compressed motion information in the line buffer. In this case, since the decoding information of the CTU for which decoding is completed is compressed and stored in the line buffer, there is an advantage in that a large amount of data may be stored in the line buffer, but there may be a possibility that the loss of the decoding information will occur during the compression process.

As another embodiment, when the first CTU is decoded, the decoding apparatus 300 may store the motion information for the blocks in the first CTU in the line buffer. In addition, when decoding the next CTU of the first CTU is completed, the decoding apparatus 300 may perform a process of compressing the motion information for the blocks in the first CTU stored in the line buffer in units of the predetermined block. In this case, since the decoding information of the CTU for which decoding is completed is stored in the line buffer without compression, the performance of the line buffer may be decreased as compared with the case of storing the compressed information, but there is an effect that the decrease in prediction performance which occurs during the compression process may be minimized. This may be designed by considering the relationship between the performance of the line buffer and the prediction performance.

In compressing the motion information of the first CTU in a predetermined block unit (compression unit), the decoding apparatus 300 may select a candidate block at a representative position among the blocks of the first CTU included in the predetermined block unit and set the motion vector of the selected candidate block to be included in the representative motion information stored by representing the blocks of the first CTU included in the predetermined block unit.

Here, the candidate block may be determined by specifying the representative position in the predetermined block unit. For example, the candidate block may include at least one of a block located on the top left, a block located on the bottom right, a block located at the center, a block located on the top right, or a block located on the bottom left in the predetermined block unit.

Further, in respect to the candidate block, one optimized candidate block may be used by considering the hardware complexity of the decoder or a plurality of candidate blocks may be used by considering the trade off condition of the compression performance and the complexity.

As an embodiment, when the number of candidate blocks is determined as a plural number, the decoding apparatus 300 searches a plurality of candidate blocks in a predetermined order to select a candidate block which satisfies a predetermined condition. Here, the predetermined condition refers to determining whether the corresponding candidate blocks is a block for which the prediction is performed in the inter prediction mode, and when the corresponding candidate block is the block predicted in the inter prediction mode, the corresponding candidate block may be determined as an available candidate block which satisfies the predetermined condition.

Further, in compressing the motion information of the first CTU in a predetermined block unit (compression unit), the decoding apparatus 300 may select a candidate block at a representative position based on the areas of the blocks of the first CTU included in the predetermined block unit and set the motion vector of the selected candidate block to be included in the representative motion information stored by representing the blocks of the first CTU included in the predetermined block unit. As an embodiment, the decoding apparatus 300 may select a block having the largest area among the blocks of the first CTU included in the predetermined block unit as the candidate block and set the motion vector of the selected block having the largest area to be included in the representative motion information for the corresponding block unit.

The predetermined block unit may be equal to or larger than the size of the minimum prediction unit. For example, when the size of the minimum prediction unit is the 4×4 size, the predetermined block unit may be set to a block unit having a size larger than 4×4 and may be set to a block having a size such as 8×8, 16×16, 32×32, 64×64, etc., for example. Further, according to the design of the encoder, the predetermined block unit may be set to the block unit having the 4×4 size.

The method for compressing the motion information of the CTU in the predetermined block unit has been described in detail with reference to FIGS. 11 to 22, so a detailed description thereof will be omitted in the embodiment. Of course, even in the embodiment, the embodiments disclosed in FIGS. 11 to 22 may be applied.

The decoding apparatus 300 may decode the second CTU in the current picture by using the decoding information of the first CTU stored in the line buffer (S2420).

Here, the second CTU is decoded after the first CTU in the current picture in the decoding order and, for example, the second CTU may be located on the right side of the first CTU or located on the bottom of the first CTU. In other words, the already decoded first CTU may be located on the left side of the second CTU or the top of the second CTU.

As an embodiment, the decoding apparatus 300 may perform prediction for the second CTU during a decoding process of the second CTU. In this case, the second CTU may be predicted by using the decoding information of the first CTU located around the second CTU. As described with reference to FIGS. 7 to 10, the decoding information of the first CTU may be compressed and stored in the line buffer in the predetermined block unit or all decoding information for the blocks in the first CTU may be stored while not being compressed according to an embodiment.

For example, when the decoding apparatus 300 is designed by considering efficiency for the performance of the line buffer, the decoding apparatus 300 may operate as in the embodiment of FIG. 7 described above. In this case, the decoding information of the first CTU may be compressed and stored in the line buffer in the predetermined block unit. Accordingly, the decoding apparatus 300 may perform the prediction of the second CTU by referring to the compressed decoding information of the first CTU stored in the line buffer.

As another example, when the decoding apparatus 300 is designed to increase compression efficiency while minimizing deterioration in prediction performance, the decoding apparatus 300 may operate as in the embodiments described in FIGS. 8 to 10. In this case, the decoding apparatus 300 may not compress the decoding information of the previous CTU (first CTU) used for predicting the current CTU (second CTU) but store the decoding information in the line buffer, and then, when decoding of the current CTU (second CTU) is completed, perform the compression process and store the decoding information in the line buffer or a DRAM. For example, when the first CTU is located around the left side of the second CTU, the decoding apparatus 300 may perform prediction of the second CTU by referring to the decoding information of the first CTU stored in the line buffer (not compressed). Alternatively, when the first CTU is located around the top of the second CTU, the compression process of the decoding information of the first CTU may be already performed before decoding the second CTU. In this case, the decoding apparatus 300 may perform the prediction of the second CTU by referring to the compressed decoding information of the first CTU stored in the line buffer.

The decoding information may be motion information of blocks in the CTU or decoded sample values of the blocks in the CTU. For example, when the current block in the CTU is decoded in the intra prediction mode, the decoding information of the CTU may mean a decoded sample value of the current block in the corresponding CTU. Alternatively, when the current block in the CTU is decoded in the inter prediction mode, the decoding information of the CTU may mean motion information of the current block in the corresponding CTU.

In the aforementioned embodiment, methods have been described based on flowcharts as a series of steps or blocks, but the methods are not limited to the order of the steps of the present disclosure and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present disclosure and may be deleted.

The embodiments described herein may be implemented and performed on a processor, a microprocessor, a controller, or a chip. For example, functional units illustrated in each drawing may be implemented and performed on a computer, the processor, the microprocessor, the controller, or the chip. In this case, information (e.g., information on instructions) or an algorithm for implementation may be stored in a digital storage medium.

In addition, the decoding apparatus and the encoding apparatus to which the present disclosure is applied may be included in a multimedia broadcasting transmitting and receiving device, a mobile communication terminal, a home cinema video device, a digital cinema video device, a surveillance camera, a video chat device, a real time communication device such as video communication, a mobile streaming device, storage media, a camcorder, a video on demand (VoD) service providing device, an (Over the top) OTT video device, an Internet streaming service providing device, a 3 dimensional (3D) video device, a video telephone video device, a transportation means terminal (e.g., a vehicle terminal, an airplane terminal, a ship terminal, etc.), and a medical video device, etc., and may be used to process a video signal or a data signal. For example, the Over the top (OTT) video device may include a game console, a Blu-ray player, an Internet access TV, a home theater system, a smartphone, a tablet PC, a digital video recorder (DVR), and the like.

In addition, a processing method to which the present disclosure is applied may be produced in the form of a program executed by the computer, and may be stored in a computer-readable recording medium. Multimedia data having a data structure according to the present disclosure may also be stored in the computer-readable recording medium. The computer-readable recording medium includes all types of storage devices and distribution storage devices storing computer-readable data. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media implemented in the form of a carrier wave (e.g., transmission over the Internet). Further, the bitstream generated by the encoding method may be stored in the computer-readable recording medium or transmitted through a wired/wireless communication network.

In addition, the embodiment of the present disclosure may be implemented as a computer program product by a program code, which may be performed on the computer by the embodiment of the present disclosure. The program code may be stored on a computer-readable carrier.

Figure 25:
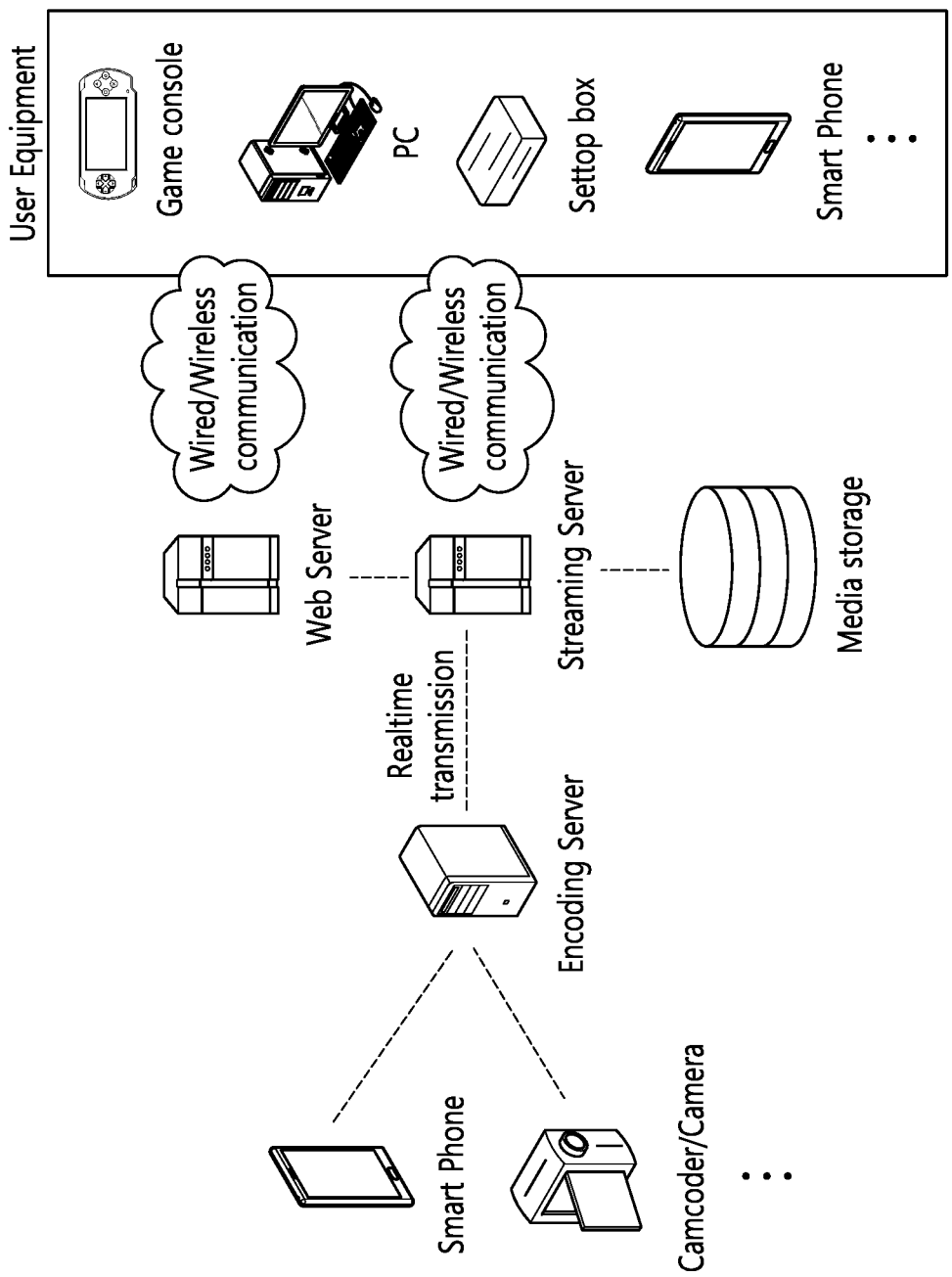
FIG. 25 exemplarily illustrates a structure diagram of a content streaming system to which the present disclosure is applied.

FIG. 25 illustrates an example of a content streaming system to which embodiments disclosed in this document may be applied.

The content streaming system to which the embodiment(s) of this document is applied may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

What is claimed is:

1. An image decoding method performed by a decoding apparatus, the method comprising:
    decoding a first coding tree unit (CTU) in a current picture;
    storing motion information of the first CTU in a line buffer; and
    decoding a second CTU in the current picture by using the motion information of the first CTU stored in the line buffer,
    wherein the decoding of the second CTU in the current picture comprises:
    performing prediction on a current block in the second CTU, and
    deriving prediction samples for the current block in the second CTU based on the prediction,
    wherein a CTU includes at least one or more coding units,
    wherein the first CTU is located around a left side of the second CTU or located around a top of the second CTU,
    wherein the storing of the motion information of the first CTU in the line buffer comprises:
    compressing the motion information of the first CTU stored in the line buffer in units of a predetermined block,
    wherein the compressing of the motion information of the first CTU in units of the predetermined block comprises:
    selecting a candidate block at a representative location among blocks included in the predetermined block unit, wherein the candidate block is a block included in the first CTU, and
    including a motion vector of the candidate block in motion information stored on behalf of blocks included in the predetermined block unit.

2. The image decoding method of claim 1, wherein when the first CTU is located around the left side of the second CTU, if decoding of the second CTU is completed, the motion information of the first CTU stored in the line buffer is compressed in units of the predetermined block.

3. The image decoding method of claim 1, wherein the motion information of the first CTU includes motion vectors of blocks in the first CTU.

4. The image decoding method of claim 3, wherein when a block in the second CTU is decoded in an inter prediction mode, the block in the second CTU is decoded based on the motion vectors of the blocks in the first CTU.

5. The image decoding method of claim 1, wherein the candidate block is a block located on a top left, a block located on a bottom right, a block located at a center, a block located on a top right, or a block located on a bottom left in the predetermined block unit.

6. The image decoding method of claim 1, wherein in the selecting of the candidate block, when there is a plurality of candidate blocks, a candidate block satisfying a predetermined condition is selected by searching the plurality of candidate blocks in a predetermined order.

7. The image decoding method of claim 6, wherein the predetermined condition is to determine whether the candidate block is a block decoded in the inter prediction mode.

8. The image decoding method of claim 1, wherein the compressing of the motion information of the first CTU in units of the predetermined block includes
    selecting a candidate block based on areas of blocks included in the predetermined block unit, and
    including a motion vector of the candidate block in motion information stored on behalf of the blocks included in the predetermined block unit.

9. The image decoding method of claim 8, wherein in the selecting of the candidate block, a block having the largest area among the blocks included in the predetermined block unit is selected as the candidate block.

10. An image encoding method performed by an encoding apparatus, the method comprising:
    encoding a first coding tree unit (CTU) in a current picture;
    storing motion information of the first CTU in a line buffer; and
    encoding a second CTU in the current picture by using the motion information of the first CTU stored in the line buffer, wherein the encoding of the second CTU in the current picture comprises:

performing prediction on a current block in the second CTU, and deriving prediction samples for the current block in the second CTU based on the prediction, wherein a CTU includes at least one or more coding units, wherein the first CTU is located around a left side of the second CTU or located around a top of the second CTU, wherein the storing of the motion information of the first CTU in the line buffer comprises:

compressing the motion information of the first CTU stored in the line buffer in units of a predetermined block, wherein the compressing of the motion information of the first CTU in units of the predetermined block comprises:

selecting a candidate block at a representative location among blocks included in the predetermined block unit, wherein the candidate block is a block included in the first CTU and including a motion vector of the candidate block in motion information stored on behalf of the blocks included in the predetermined block unit.

* * * * *